(12) United States Patent
Nagakura et al.

(10) Patent No.: US 10,376,742 B2
(45) Date of Patent: Aug. 13, 2019

(54) GOLF BALL

(71) Applicant: SUMITOMO RUBBER INDUSTRIES, LTD., Kobe-shi, Hyogo (JP)

(72) Inventors: Hikaru Nagakura, Kobe (JP); Kazuyoshi Shiga, Kobe (JP); Chiemi Mikura, Kobe (JP); Takahiro Shigemitsu, Kobe (JP); Ryota Sakamine, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 15/260,497

(22) Filed: Sep. 9, 2016

(65) Prior Publication Data
US 2017/0072268 A1 Mar. 16, 2017

(30) Foreign Application Priority Data

Sep. 10, 2015 (JP) .................................. 2015-178224
Sep. 10, 2015 (JP) .................................. 2015-178225

(51) Int. Cl.
| | | |
|---|---|---|
| *A63B 37/02* | (2006.01) | |
| *C08K 5/09* | (2006.01) | |
| *C08K 5/098* | (2006.01) | |
| *C08L 9/00* | (2006.01) | |
| *A63B 37/00* | (2006.01) | |
| *C08K 3/30* | (2006.01) | |
| *C08K 5/092* | (2006.01) | |
| *C08K 5/14* | (2006.01) | |
| *C08K 3/22* | (2006.01) | |
| *C08K 5/372* | (2006.01) | |

(52) U.S. Cl.
CPC ...... *A63B 37/0051* (2013.01); *A63B 37/0003* (2013.01); *A63B 37/0074* (2013.01); *C08K 3/22* (2013.01); *C08K 3/30* (2013.01); *C08K 5/09* (2013.01); *C08K 5/092* (2013.01); *C08K 5/098* (2013.01); *C08K 5/14* (2013.01); *C08K 5/372* (2013.01); *C08K 2003/2296* (2013.01); *C08K 2003/3045* (2013.01)

(58) Field of Classification Search
CPC .................................. C08K 5/098; C08K 5/09
See application file for complete search history.

(56) References Cited

U.S. PATENT DOCUMENTS

| | | | | |
|---|---|---|---|---|
| 6,762,247 B2* | 7/2004 | Voorheis | ............ | A63B 37/0003 473/354 |
| 6,943,208 B2* | 9/2005 | Higuchi | ............... | C08K 5/0016 473/371 |
| 2003/0208000 A1* | 11/2003 | Higuchi | ................ | C08F 279/02 525/274 |
| 2005/0256274 A1 | 11/2005 | Voorheis et al. | | |
| 2008/0214324 A1 | 9/2008 | Nanba et al. | | |
| 2012/0142453 A1* | 6/2012 | Mikura | ............ | A63B 37/0003 473/372 |
| 2013/0005505 A1 | 1/2013 | Sajima et al. | | |

FOREIGN PATENT DOCUMENTS

JP 2008-212681 A 9/2008

OTHER PUBLICATIONS

Chemical Book entry for Zinc Oleate (2017). (Year: 2017).*
Chemical Book entry for oleic acid (2017). (Year: 2017).*
Extended European Search Report, dated Jan. 23, 2017, for European Application No. 16187845.9.

* cited by examiner

*Primary Examiner* — David J Buttner
(74) *Attorney, Agent, or Firm* — Birch, Stewart, Kolasch & Birch, LLP

(57) ABSTRACT

An object of the present invention is to provide a golf ball having an excellent flight performance on driver shots. The present invention provides a golf ball comprising a spherical core and at least one cover covering the spherical core, wherein the spherical core is formed from a rubber composition containing (a) a base rubber, (b) an α,β-unsaturated carboxylic acid having 3 to 8 carbon atoms and/or a metal salt thereof as a co-crosslinking agent, (c) a crosslinking initiator, and (d) an unsaturated fatty acid and/or a metal salt thereof excluding an α,β-unsaturated carboxylic acid having 3 to 8 carbon atoms and/or a metal salt thereof, and provided that the rubber composition further contains (f) a metal compound if only an α,β-unsaturated carboxylic acid having 3 to 8 carbon atoms is present as (b) the co-crosslinking agent.

19 Claims, 1 Drawing Sheet

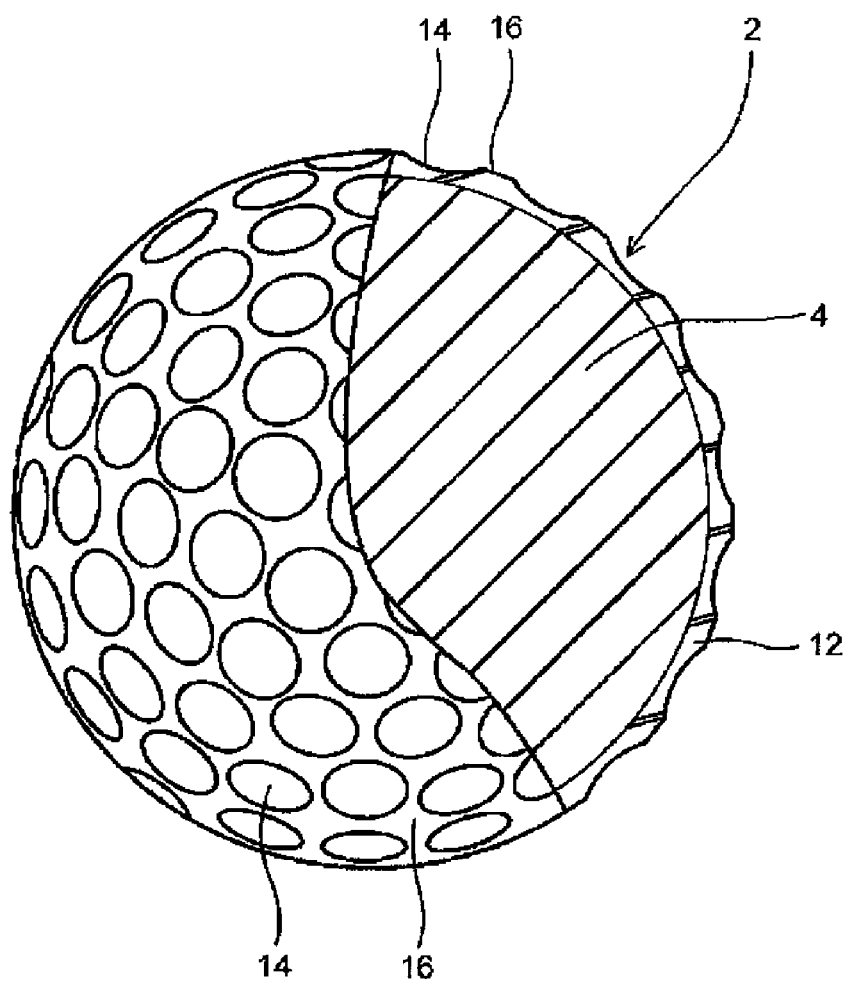

GOLF BALL

FIELD OF THE INVENTION

The present invention relates to a golf ball having an excellent flight performance, more specifically, relates to an improvement of a core of a golf ball.

DESCRIPTION OF THE RELATED ART

As a method for increasing a flight distance of a golf ball on driver shots, for example, there are a method of using a core having a high resilience and a method of using a core having a hardness distribution in which the hardness increases from the core center toward the core surface. The former method has an effect of enhancing a golf ball initial speed, and the latter method has an effect of a higher launch angle and a lower spin rate. A golf ball having a higher launch angle and a lower spin rate travels a greater flight distance.

As a technique for enhancing a resilience of a core, there is a method of adding an organic sulfur compound in a rubber composition for forming a core. In addition, as a technique for enhancing a resilience of a core, for example, Japanese Patent Publication No. 2008-212681 A discloses a golf ball comprising a crosslinked molded-product of a rubber composition as a constituting member, wherein the rubber composition comprises a base rubber, a filler, an organic peroxide, an α,β-unsaturated carboxylic acid and/or a metal salt thereof as essential components, and further comprises a copper salt of a saturated or unsaturated fatty acid.

SUMMARY OF THE INVENTION

An object of the present invention is to provide a golf ball having an excellent flight performance.

The present invention provides a golf ball comprising a spherical core and at least one cover covering the spherical core, wherein the spherical core is formed from a rubber composition containing (a) a base rubber, (b) an α,β-unsaturated carboxylic acid having 3 to 8 carbon atoms and/or a metal salt thereof as a co-crosslinking agent, (c) a crosslinking initiator, and (d) an unsaturated fatty acid and/or a metal salt thereof, and provided that the rubber composition further contains (f) a metal compound if only an α,β-unsaturated carboxylic acid having 3 to 8 carbon atoms is present as (b) the co-crosslinking agent.

The present invention provides a golf ball having an excellent flight performance.

BRIEF DESCRIPTION OF THE DRAWINGS

FIG. 1 is a partially cutaway sectional view showing a golf ball according to an embodiment of the present invention.

DESCRIPTION OF THE PREFERRED EMBODIMENT

The present invention provides a golf ball comprising a spherical core and at least one cover covering the spherical core, wherein the spherical core is formed from a rubber composition containing (a) a base rubber, (b) an α,β-unsaturated carboxylic acid having 3 to 8 carbon atoms and/or a metal salt thereof as a co-crosslinking agent, (c) a crosslinking initiator, and (d) an unsaturated fatty acid and/or a metal salt thereof, and provided that the rubber composition further contains (f) a metal compound if only an α,β-unsaturated carboxylic acid having 3 to 8 carbon atoms is present as (b) the co-crosslinking agent.

[(a) Base Rubber]

As (a) the base rubber, a natural rubber and/or a synthetic rubber may be used. For example, polybutadiene rubber, natural rubber, polyisoprene rubber, styrene polybutadiene rubber, ethylene-propylene-diene rubber (EPDM), or the like may be used. These rubbers may be used solely or in combination of at least two of them. Among them, typically preferred is a high-cis polybutadiene having a cis-1,4 bond in a proportion of 40 mass % or more, preferably 80 mass % or more, more preferably 90 mass % or more in view of its superior resilience property.

The high-cis polybutadiene preferably has a 1,2-vinyl bond in an amount of 2.0 mass % or less, more preferably 1.7 mass % or less, even more preferably 1.5 mass % or less. If the amount of the 1,2-vinyl bond is excessively high, the resilience may be lowered.

The high-cis polybutadiene is preferably one synthesized using a rare-earth element catalyst. When a neodymium catalyst employing a neodymium compound which is a lanthanum series rare-earth element compound, is used, a polybutadiene rubber having a high amount of the cis-1,4 bond and a low amount of the 1,2-vinyl bond is obtained with an excellent polymerization activity, and thus such polybutadiene rubber is particularly preferred.

The high-cis polybutadiene preferably has a molecular weight distribution Mw/Mn (Mw: weight average molecular weight, Mn: number average molecular weight) of 2.0 or more, more preferably 2.2 or more, even more preferably 2.4 or more, most preferably 2.6 or more, and preferably has a molecular weight distribution Mw/Mn of 6.0 or less, more preferably 5.0 or less, even more preferably 4.0 or less, most preferably 3.4 or less. If the molecular weight distribution (Mw/Mn) of the high-cis polybutadiene is excessively low, the processability may deteriorate, and if the molecular weight distribution (Mw/Mn) of the high-cis polybutadiene is excessively high, the resilience may be lowered. It is noted that the molecular weight distribution is measured by gel permeation chromatography ("HLC-8120GPC" available from Tosoh Corporation) using a differential refractometer as a detector under the conditions of column: GMHHXL (available from Tosoh Corporation), column temperature: 40° C., and mobile phase: tetrahydrofuran, and calculated by converting based on polystyrene standard.

The high-cis polybutadiene preferably has a Mooney viscosity ($ML_{1+4}$ (100° C.)) of 30 or more, more preferably 32 or more, even more preferably 35 or more, and preferably has a Mooney viscosity ($ML_{1+4}$ (100° C.)) of 140 or less, more preferably 120 or less, even more preferably 100 or less, most preferably 80 or less. It is noted that the Mooney viscosity ($ML_{1+4}$ (100° C.)) in the present invention is a value measured according to JIS K6300 using an L rotor under the conditions of preheating time: 1 minute, rotor rotation time: 4 minutes, and temperature: 100° C.

As (a) the base rubber, the rubber composition preferably contains at least two high-cis polybutadienes having a Mooney viscosity ($ML_{1+4}$ (100° C.)) different from each other, more preferably contains two high-cis polybutadienes having a Mooney viscosity ($ML_{1+4}$ (100° C.)) different from each other. In case of containing two high-cis polybutadienes, it is preferred that the first high-cis polybutadiene has a Mooney viscosity ($ML_{1+4}$ (100° C.)) of less than 50, and the second high-cis polybutadiene has a Mooney viscosity ($ML_{1+4}$ (100° C.)) of 50 or more.

The first high-cis polybutadiene preferably has a Mooney viscosity ($ML_{1+4}$ (100° C.)) of 30 or more, more preferably 32 or more, even more preferably 35 or more, and preferably has a Mooney viscosity ($ML_{1+4}$ (100° C.)) of less than 50, more preferably 49 or less, even more preferably 48 or less. The second high-cis polybutadiene preferably has a Mooney viscosity ($ML_{1+4}$ (100° C.)) of 50 or more, more preferably 52 or more, even more preferably 54 or more, and preferably has a Mooney viscosity ($ML_{1+4}$ (100° C.)) of 100 or less, more preferably 90 or less, even more preferably 80 or less, most preferably 70 or less.

A mass ratio (first high-cis polybutadiene/second high-cis polybutadiene) of the first high-cis polybutadiene to the second high-cis polybutadiene in (a) the base rubber is preferably 0.3 or more, more preferably 0.5 or more, even more preferably 0.7 or more, and is preferably 3.0 or less, more preferably 2.0 or less, even more preferably 1.5 or less.

As (a) the base rubber, the rubber composition also preferably contains a polybutadiene rubber and a polyisoprene rubber. The polyisoprene rubber preferably has a Mooney viscosity ($ML_{1+4}$ (100° C.)) of 55 or more, more preferably 60 or more, even more preferably 65 or more, and preferably has a Mooney viscosity ($ML_{1+4}$ (100° C.)) of 120 or less, more preferably 110 or less, even more preferably 100 or less.

A mass ratio (polybutadiene rubber/polyisoprene rubber) of the polybutadiene rubber to the polyisoprene rubber in (a) the base rubber is preferably 1 or more, more preferably 2 or more, even more preferably 4 or more, and is preferably 20 or less, more preferably 15 or less, even more preferably 10 or less.

[(b) Co-Crosslinking Agent]

(b) The $\alpha,\beta$-unsaturated carboxylic acid having 3 to 8 carbon atoms and/or the metal salt thereof is blended as a co-crosslinking agent in the rubber composition, and has an action of crosslinking a rubber molecule by graft polymerization to a base rubber molecular chain. In the case that the rubber composition used in the present invention contains only the $\alpha,\beta$-unsaturated carboxylic acid having 3 to 8 carbon atoms as the co-crosslinking agent, the rubber composition further contains (f) a metal compound as an essential component. This is because neutralizing the $\alpha,\beta$-unsaturated carboxylic acid having 3 to 8 carbon atoms with the metal compound in the rubber composition provides substantially the same effect as using the metal salt of the $\alpha,\beta$-unsaturated carboxylic acid having 3 to 8 carbon atoms as the co-crosslinking agent. Further, in case of using the $\alpha,\beta$-unsaturated carboxylic acid having 3 to 8 carbon atoms and the metal salt thereof in combination as the co-crosslinking agent, (f) the metal compound may be used as an optional component.

Examples of the $\alpha,\beta$-unsaturated carboxylic acid having 3 to 8 carbon atoms include acrylic acid, methacrylic acid, fumaric acid, maleic acid, crotonic acid, and the like.

Examples of the metal constituting the metal salt of the $\alpha,\beta$-unsaturated carboxylic acid having 3 to 8 carbon atoms include a monovalent metal ion such as sodium, potassium, lithium or the like; a divalent metal ion such as magnesium, calcium, zinc, barium, cadmium or the like; a trivalent metal ion such as aluminum or the like; and other metal ions such as tin, zirconium or the like. The metal component may be used solely or as a mixture of at least two of them. Among them, as the metal component, the divalent metal such as magnesium, calcium, zinc, barium, cadmium or the like is preferred. This is because use of the divalent metal salt of the $\alpha,\beta$-unsaturated carboxylic acid having 3 to 8 carbon atoms easily generates a metal crosslinking between the rubber molecules. Especially, as the divalent metal salt, zinc acrylate is preferred, because zinc acrylate enhances the resilience of the resultant golf ball. The $\alpha,\beta$-unsaturated carboxylic acid having 3 to 8 carbon atoms and/or the metal salt thereof may be used solely or in combination at least two of them.

The amount of (b) the $\alpha,\beta$-unsaturated carboxylic acid having 3 to 8 carbon atoms and/or the metal salt thereof is preferably 15 parts by mass or more, more preferably 20 parts by mass or more, even more preferably 25 parts by mass or more, and is preferably 50 parts by mass or less, more preferably 45 parts by mass or less, even more preferably 35 parts by mass or less, with respect to 100 parts by mass of (a) the base rubber. If the amount of (b) the $\alpha,\beta$-unsaturated carboxylic acid having 3 to 8 carbon atoms and/or the metal salt thereof is less than 15 parts by mass, the amount of (c) the crosslinking initiator which will be explained below must be increased in order to obtain an appropriate hardness of the constituting member formed from the rubber composition, which tends to lower the resilience of the golf ball. On the other hand, if the amount of the $\alpha,\beta$-unsaturated carboxylic acid having 3 to 8 carbon atoms and/or the metal salt thereof exceeds 50 parts by mass, the constituting member formed from the rubber composition becomes so hard that the shot feeling of the golf ball may be lowered.

[(c) Crosslinking Initiator]

(c) The crosslinking initiator is blended in order to crosslink (a) the base rubber component. As (c) the crosslinking initiator, an organic peroxide is preferred. Specific examples of the organic peroxide include an organic peroxide such as dicumyl peroxide, 1,1-bis(t-butylperoxy)-3,3,5-trimethylcyclohexane, 2,5-dimethyl-2,5-di(t-butylperoxy)hexane, di-t-butylperoxide or the like. These organic peroxides may be used solely or in combination at least two of them. Among them, dicumyl peroxide is preferably used.

The amount of (c) the crosslinking initiator is preferably 0.2 part by mass or more, more preferably 0.5 part by mass or more, even more preferably 0.7 part by mass or more, and is preferably 5.0 parts by mass or less, more preferably 2.5 parts by mass or less, even more preferably 2.0 parts by mass or less, most preferably 0.9 part by mass or less, with respect to 100 parts by mass of (a) the base rubber. If the amount of (c) the crosslinking initiator is less than 0.2 part by mass, the constituting member formed from the rubber composition becomes so soft that the resilience of the golf ball may be lowered. If the amount of (c) the crosslinking initiator exceeds 5.0 parts by mass, the amount of (b) the co-crosslinking agent which has been explained above must be decreased in order to obtain an appropriate hardness of the constituting member formed from the rubber composition, which may lower the resilience of the golf ball or worsen the durability of the golf ball.

[(d) Unsaturated Fatty Acid and/or Metal Salt Thereof]

(d) The unsaturated fatty acid and/or the metal salt thereof is an aliphatic monocarboxylic acid having at least one unsaturated bond in the hydrocarbon chain and/or a metal salt thereof. It is noted that (d) the unsaturated fatty acid and/or the metal salt thereof excludes (b) the $\alpha,\beta$-unsaturated carboxylic acid having 3 to 8 carbon atoms and/or the metal salt thereof used as the co-crosslinking agent.

The reason that the resilience of the spherical core improves if (d) the unsaturated fatty acid and/or the metal salt thereof is blended, is considered as follows. When the spherical core is molded, (b) the metal salt of the $\alpha,\beta$-unsaturated carboxylic acid having 3 to 8 carbon atoms in the rubber composition is grafted to (a) the base rubber to form a graft polymer, thereby crosslinking the rubber molecule. Further, the component (b) can form an ion cluster, thus the grafting reaction between the component (b) constituting the ion cluster and (a) the base rubber progresses more easily. The component (d) has a double bond, thus the component (d) can be added to the double bond of the component (b). Further, the component (d) can enter into the ion cluster through a cation exchange reaction with the ion cluster formed by the component (b). Like this, the component (d) is added to the component (b) or enters into the ion cluster formed by the component (b), the resultant spherical core has a high resilience.

The amount of the carbon-carbon double bond per unit mass of (d) the unsaturated fatty acid and/or the metal salt thereof is preferably 1.00 mmol/g or more, more preferably 1.50 mmol/g or more, even more preferably 2.00 mmol/g or more, and is preferably 10.00 mmol/g or less, more preferably 9.00 mmol/g or less, even more preferably 8.00 mmol/g or less. If the amount of the carbon-carbon double bond per unit mass of the component (d) is 1.00 mmol/g or more, the addition reaction between the component (d) and the component (b) occurs more easily, and thus the obtained spherical core has a higher resilience. If the amount of the carbon-carbon double bond per unit mass of the component (d) is 10.00 mmol/g or less, the component (d) enters into the ion cluster formed by the component (b) more easily, and thus the obtained spherical core has a higher resilience.

(d) The unsaturated fatty acid and/or the metal salt thereof preferably has 4 or more carbon atoms, more preferably 5 or more carbon atoms, even more preferably 8 or more carbon atoms, most preferably 12 or more carbon atoms, and preferably has 33 or less carbon atoms, more preferably 30 or less carbon atoms, even more preferably 27 or less carbon atoms, most preferably 26 or less carbon atoms. If the component (d) is an unsaturated fatty acid having 4 or more carbon atoms and/or a metal salt thereof, the component (d) enters into the ion cluster formed by the component (b) more easily, and thus the obtained spherical core has a higher resilience. If the component (d) is an unsaturated fatty acid having 33 or less carbon atoms and/or a metal salt thereof, the addition reaction between the component (d) and the component (b) occurs more easily, and thus the obtained spherical core has a higher resilience.

Examples of (d) the unsaturated fatty acid and/or the metal salt thereof include the first preferable embodiment and the second preferable embodiment.

First Preferable Embodiment of (d) the Unsaturated Fatty Acid and/or Metal Salt Thereof (d) The unsaturated fatty acid and/or the metal salt thereof preferably has 1 or more carbon-carbon double bonds, and preferably has 4 or less carbon-carbon double bonds, more preferably has 2 or less carbon-carbon double bonds, even more preferably has 1 carbon-carbon double bond. If the component (d) is an unsaturated fatty acid having 4 or less carbon-carbon double bonds and/or a metal salt thereof, the addition reaction between the component (d) and the component (b) occurs more easily, and thus the obtained spherical core has a higher resilience.

As (d) the unsaturated fatty acid and/or the metal salt thereof, a linear unsaturated fatty acid and/or a metal salt thereof is preferred. Further, in the case that the component (d) is an unsaturated fatty acid having 8 or more carbon atoms and/or a metal salt thereof, the component (d) preferably has the first carbon-carbon double bond at the second or later carbon, more preferably at the fourth or later carbon, even more preferably at the sixth or later carbon, counted from the methyl group side which is the terminal of the unsaturated fatty acid, and preferably has the first carbon-carbon double bond at the second or later carbon, more preferably at the fourth or later carbon, even more preferably at the sixth or later carbon, counted from the carboxyl group side thereof.

Specific examples of the unsaturated fatty acid constituting (d) the unsaturated fatty acid and/or the metal salt thereof (IUPAC name) include butenoic acid (C4), pentenoic acid (C5), hexenoic acid (C6), heptenoic acid (C7), octenoic acid (C8), nonenoic acid (C9), decenoic acid (C10), undecenoic acid (C11), dodecenoic acid (C12), tridecenoic acid (C13), tetradecenoic acid (C14), pentadecenoic acid (C15), hexadecenoic acid (C16), heptadecenoic acid (C17), octadecenoic acid (C18), nonadecenoic acid (C19), icosenoic acid (C20), henicosenoic acid (C21), docosenoic acid (C22), tricosenoic acid (C23), tetracosenoic acid (C24), pentacosenoic acid (C25), hexacosenoic acid (C26), heptacosenoic acid (C27), octacosenoic acid (C28), nonacosenoic acid (C29), triacontenoic acid (C30), hentriacontenoic acid (C31), dotriacontenoic acid (C32), and tritriacontenoic acid (C33).

Specific examples of the unsaturated fatty acid constituting (d) the unsaturated fatty acid and/or the metal salt thereof (common name) include undecylenic acid (C11, monounsaturated fatty acid, n–1), myristoleic acid (C14, monounsaturated fatty acid, n–5), palmitoleic acid (C16, monounsaturated fatty acid, n–7), stearidonic acid (C18, tetraunsaturated fatty acid, n–3), vaccenic acid (C18, monounsaturated fatty acid, n–7), oleic acid (C18, monounsaturated fatty acid, n–9), elaidic acid (C18, monounsaturated fatty acid, n–9), linoleic acid (C18, diunsaturated fatty acid, n–6), α-linolenic acid (C18, triunsaturated fatty acid, n–3), γ-linolenic acid (C18, triunsaturated fatty acid, n–6), gadoleic acid (C20, monounsaturated fatty acid, n–11), eicosenoic acid (C20, monounsaturated fatty acid, n–11), eicosadienoic acid (C20, diunsaturated fatty acid, n–6), arachidonic acid (C20, tetraunsaturated fatty acid, n–6), eicosapentaenoic acid (C20, pentaunsaturated fatty acid, n–3), erucic acid (C22, monounsaturated fatty acid, n–9), docosahexaenoic acid (C22, hexaunsaturated fatty acid, n–3), and nervonic acid (C24, monounsaturated fatty acid, n–9). It is noted that n–5 or the like described in the parentheses after the compound names indicates the carbon position where the first carbon-carbon double bond is located, counted from the methyl group side which is the terminal of the unsaturated fatty acid.

Among them, preferable examples of the unsaturated fatty acid constituting (d) the unsaturated fatty acid and/or the metal salt thereof include undecylenic acid (C11, monounsaturated fatty acid, n–1), myristoleic acid (C14, monounsaturated fatty acid, n–5), palmitoleic acid (C16, monounsaturated fatty acid, n–7), oleic acid (C18, monounsaturated fatty acid, n–9), linoleic acid (C18, diunsaturated fatty acid, n–6), eicosenoic acid (C20, monounsaturated fatty acid, n–11), erucic acid (C22, monounsaturated fatty acid, n–9), and nervonic acid (C24, monounsaturated fatty acid, n–9).

Second Preferable Embodiment of (d) the Unsaturated Fatty Acid and/or Metal Salt Thereof In the case that (d) the unsaturated fatty acid and/or the metal salt thereof is an unsaturated fatty acid having 5 or more carbon atoms and/or a metal salt thereof, (d) the unsaturated fatty acid and/or the metal salt thereof preferably has the first carbon-carbon double bond at the fourth or later carbon, more preferably at the sixth or later carbon, even more preferably at the eighth or later carbon, counted from the carboxyl group side thereof. If the component (d) is an unsaturated fatty acid having the first carbon-carbon double bond at the fourth or later carbon counted from the carboxyl group side and/or a metal salt thereof, the addition reaction between the component (d) and the component (b) occurs more easily, and thus the obtained spherical core has a higher resilience.

(d) The unsaturated fatty acid and/or the metal salt thereof is preferably an unsaturated fatty acid represented by the chemical formula (1) and/or a metal salt thereof.

[Chemical formula 1]

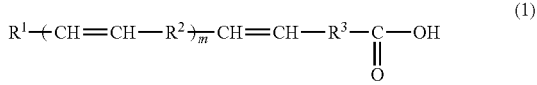

(1)

In the chemical formula (1), $R^1$ represents a hydrogen atom or an alkyl group having 1 to 25 carbon atoms, $R^2$ represents an alkylene group having 1 to 25 carbon atoms, $R^3$ represents an alkylene group having 2 to 25 carbon atoms, m represents a natural number ranging from 0 to 5, and when m ranges from 2 to 5, multiple $R^2$ may be identical to or different from each other.

The alkyl group having 1 to 25 carbon atoms represented by $R^1$ may have a branched structure or a cyclic structure, but is preferably a linear alkyl group. The alkyl group $R^1$ preferably has 1 or more carbon atoms, more preferably 3 or more carbon atoms, even more preferably 5 or more carbon atoms, and preferably has 25 or less carbon atoms, more preferably 23 or less carbon atoms, even more preferably 21 or less carbon atoms.

The alkylene group having 1 to 25 carbon atoms represented by $R^2$ may have a branched structure or a cyclic structure, but is preferably a linear alkylene group. The alkylene group $R^2$ preferably has 1 or more carbon atoms, more preferably 3 or more carbon atoms, even more preferably 5 or more carbon atoms, and preferably has 25 or less carbon atoms, more preferably 23 or less carbon atoms, even more preferably 21 or less carbon atoms.

The alkylene group having 2 to 25 carbon atoms represented by $R^3$ may have a branched structure or a cyclic structure, but is preferably a linear alkylene group. The alkylene group $R^3$ preferably has 2 or more carbon atoms, more preferably 3 or more carbon atoms, even more preferably 4 or more carbon atoms, and preferably has 25 or less carbon atoms, more preferably 23 or less carbon atoms, even more preferably 21 or less carbon atoms.

The above m is preferably 3 or less, more preferably 2 or less, even more preferably 1 or less, most preferably 0.

As the compound represented by the chemical formula (1), a compound represented by the following chemical formula (2) or chemical formula (3) is more preferred.

[Chemical formula 2]

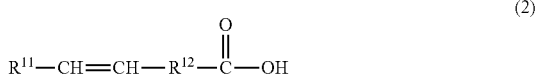

(2)

In the chemical formula (2), $R^{11}$ represents a hydrogen atom or an alkyl group having 1 to 25 carbon atoms, and $R^{12}$ represents an alkylene group having 2 to 25 carbon atoms.

The alkyl group having 1 to 25 carbon atoms represented by $R^{11}$ may have a branched structure or a cyclic structure, but is preferably a linear alkyl group. The alkylene group having 2 to 25 carbon atoms represented by $R^{12}$ may have a branched structure or a cyclic structure, but is preferably a linear alkylene group.

In the chemical formula (2), in the case that $R^{11}$ is an alkyl group, a ratio ($R^{11}/R^{12}$) of carbon atom number in $R^{11}$ to carbon atom number in $R^{12}$ is preferably 0.1 or more, more preferably 0.5 or more, even more preferably 0.8 or more, and is preferably 10.0 or less, more preferably 5.0 or less, even more preferably 1.3 or less. If the ratio ($R^{11}/R^{12}$) of carbon atom number falls within the above range, the addition reaction between the component (d) and the component (b) effectively occurs, and thus the obtained spherical core has a higher resilience.

[Chemical formula 3]

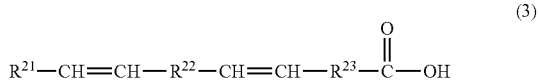

(3)

In the chemical formula (3), $R^{21}$ represents a hydrogen atom or an alkyl group having 1 to 25 carbon atoms, $R^{22}$ represents an alkylene group having 1 to 25 carbon atoms, and $R^{23}$ represents an alkylene group having 2 to 25 carbon atoms.

The alkyl group having 1 to 25 carbon atoms represented by $R^{21}$ may have a branched structure or a cyclic structure, but is preferably a linear alkyl group. The alkylene group having 1 to 25 carbon atoms represented by $R^{22}$ may have a branched structure or a cyclic structure, but is preferably a linear alkylene group. The alkylene group having 2 to 25 carbon atoms represented by $R^{23}$ may have a branched structure or a cyclic structure, but is preferably a linear alkylene group.

The alkylene group represented by $R^{22}$ preferably has 25 or less carbon atoms, more preferably 20 or less carbon atoms, even more preferably 15 or less carbon atoms. As the alkylene group represented by $R^{22}$, methylene and ethylene are preferred, methylene is more preferred.

In the chemical formula (3), in the case that $R^{21}$ is an alkyl group, a ratio ($R^{21}/R^{23}$)) of carbon atom number in $R^{21}$ to carbon atom number in $R^{23}$ is preferably 0.1 or more, more preferably 0.5 or more, even more preferably 0.8 or more, and is preferably 10.0 or less, more preferably 5.0 or less, even more preferably 1.3 or less. If the ratio ($R^{21}/R^{23}$) of carbon atom number falls within the above range, the addition reaction between the component (d) and the component (b) effectively occurs, and thus the obtained spherical core has a higher resilience.

(d) The unsaturated fatty acid and/or the metal salt thereof is preferably a linear unsaturated fatty acid and/or a metal salt thereof. (d) The unsaturated fatty acid and/or the metal salt thereof is preferably an unsaturated fatty acid having a carbon-carbon double bond at the terminal of the hydrocarbon chain and/or a metal salt thereof, and/or an unsaturated fatty acid having at least one cis-isomerized carbon-carbon double bond and/or a metal salt thereof, is more preferably the unsaturated fatty acid having at least one cis-isomerized carbon-carbon double bond and/or the metal salt thereof. If (d) the unsaturated fatty acid and/or the metal salt thereof has a carbon-carbon double bond at the terminal of the hydrocarbon chain, or has at least one cis-isomerized carbon-carbon double bond, the reactivity of the addition reaction between the component (d) and the component (b) is high, and thus the obtained spherical core has a higher resilience.

Specific examples of the unsaturated fatty acid constituting (d) the unsaturated fatty acid and/or the metal salt thereof include an unsaturated fatty acid having a double bond at the terminal thereof, such as 4-pentenoic acid (C5, monounsaturated fatty acid, (4)), 5-hexenoic acid (C6, monounsaturated fatty acid, (5)), 6-heptenoic acid (C7, monounsaturated fatty acid, (6)), 7-octenoic acid (C8, monounsaturated fatty acid, (7)), 8-nonenoic acid (C9, monounsaturated fatty acid, (8)), 9-decenoic acid (C10, monounsaturated fatty acid, (9)), and 10-undecylenic acid (C11, monounsaturated fatty acid, (10)); and an unsaturated fatty acid having a double bond at a location other than the terminal thereof, such as myristoleic acid (C14, cis-9-monounsaturated fatty acid, (9)), palmitoleic acid (C16, cis-9-monounsaturated fatty acid, (9)), stearidonic acid (C18, 6,9,12,15-tetraunsaturated fatty acid, (6)), vaccenic acid (C18, cis-11-monounsaturated fatty acid, (11)), oleic acid (C18, cis-9-monounsaturated fatty acid, (9)), elaidic acid (C18, trans-9-monounsaturated fatty acid, (9)), linoleic acid (C18, cis-9-cis-12-diunsaturated fatty acid, (9)), α-linolenic acid (C18, 9,12,15-triunsaturated fatty acid, (9)), γ-linolenic acid (C18, 6,9,12-triunsaturated fatty acid, (6)), gadoleic acid (C20, cis-9-monounsaturated fatty acid, (9)), eicosenoic acid (C20, cis-11-monounsaturated fatty acid, (11)), eicosadienoic acid (C20, cis-11-cis-14-diunsaturated fatty acid, (11)), arachidonic acid (C20, 5,8,11,14-tetraunsaturated fatty acid, (5)), eicosapentaenoic acid (C20, 5,8,11,14,17-pentaunsaturated fatty acid, (5)), erucic acid (C22, cis-13-monounsaturated fatty acid, (13)), docosahexaenoic acid (C22, 4,7,10,13,16,19-hexaunsaturated fatty acid, (4)), and nervonic acid (C24, cis-15-monounsaturated fatty acid, (15)); and the like. It is noted that (10) or the like described in the parentheses after the compound names indicates the carbon position where the first carbon-carbon double bond is located, counted from the carboxyl group side of the unsaturated fatty acid.

Among them, preferable examples of the unsaturated fatty acid constituting (d) the unsaturated fatty acid and/or the metal salt thereof include 10-undecylenic acid, myristoleic acid, palmitoleic acid, oleic acid, linoleic acid, eicosenoic acid, erucic acid, and nervonic acid.

Examples of the metal constituting (d) the unsaturated fatty acid and/or the metal salt thereof include a monovalent metal ion such as sodium, potassium, lithium or the like; a divalent metal ion such as magnesium, calcium, zinc, barium, cadmium or the like; a trivalent metal ion such as aluminum or the like; and other metal ions such as tin, zirconium or the like. The metal component may be used solely or as a mixture of at least two of them. Among them, as the metal component, the divalent metal such as magnesium, calcium, zinc, barium, cadmium or the like is preferred, zinc is particularly preferred. This is because if the divalent metal salt of (d) the unsaturated fatty acid is used, the cation exchange between the component (d) and the ion cluster formed by the component (b) easily occurs, and thus the obtained spherical core has a higher resilience. (d) The unsaturated fatty acid and/or the metal salt thereof may be used solely or in combination at least two of them.

The amount of (d) the unsaturated fatty acid and/or the metal salt thereof is preferably 1 part by mass or more, more preferably 2 parts by mass or more, even more preferably 3 parts by mass or more, and is preferably 35 parts by mass or less, more preferably 30 parts by mass or less, even more preferably 25 parts by mass or less, particularly preferably 20 parts by mass or less, most preferably 17 parts by mass or less, with respect to 100 parts by mass of (a) the base rubber. If the amount of the component (d) is 1 part by mass or more, the effect of adding the component (d) is fully exerted, and thus the obtained spherical core has a higher resilience. If the amount of the component (d) is 35 parts by mass or less, the spherical core does not become excessively soft, and thus the durability and high resilience of the golf ball do not deteriorate.

[(e) Saturated Fatty Acid and/or Metal Salt Thereof]

The rubber composition may further contain (e) a saturated fatty acid and/or a metal salt thereof. If (e) the saturated fatty acid and/or the metal salt thereof is contained, the dispersibility of the materials in the rubber composition becomes better. Examples of the fatty acid component constituting (e) the saturated fatty acid and/or the metal salt thereof include, but are not limited to, a linear saturated fatty acid and a branched saturated fatty acid. (e) The saturated fatty acid and/or the metal salt thereof may be used solely or in combination of at least two of them.

The fatty acid component constituting (e) the saturated fatty acid and/or the metal salt thereof preferably has 4 or more carbon atoms, more preferably 12 or more carbon atoms, even more preferably 16 or more carbon atoms, and preferably has 30 or less carbon atoms, more preferably 28 or less carbon atoms, even more preferably 26 or less carbon atoms.

Examples of the saturated fatty acid include butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, icosanoic acid, henicosanoic acid, docosanoic acid, tricosanoic acid, tetracosanoic acid, pentacosanoic acid, hexacosanoic acid, heptacosanoic acid, octacosanoic acid, nonacosanoic acid, and triacontanoic acid.

Examples of the cation component of the saturated fatty acid metal salt include a monovalent metal ion such as sodium, potassium, lithium, silver or the like; a divalent metal ion such as magnesium, calcium, zinc, barium, cadmium, copper, cobalt, nickel, manganese or the like; a trivalent metal ion such as aluminum, iron or the like; and other metal ions such as tin, zirconium, titanium or the like. The cation component may be used solely or as a mixture of at least two of them.

The amount of (e) the saturated fatty acid and/or the metal salt thereof is preferably 0.5 part by mass or more, more preferably 1.0 part by mass or more, even more preferably 1.5 parts by mass or more, and is preferably 5.0 parts by mass or less, more preferably 4.5 parts by mass or less, even more preferably 3.5 parts by mass or less, with respect to 100 parts by mass of (a) the base rubber. If the amount of (e) the saturated fatty acid and/or the metal salt thereof is 0.5 part by mass or more, the dispersibility of the materials in the rubber composition becomes better, and if the amount of (e) the saturated fatty acid and/or the metal salt thereof is 5.0 parts by mass or less, the change of the rubber composition in physical properties caused by containing (e) the saturated fatty acid and/or the metal salt thereof can be suppressed.

It is noted that there are cases where (b) the α,β-unsaturated carboxylic acid having 3 to 8 carbon atoms and/or the metal salt thereof is treated with zinc stearate or the like to improve the dispersibility to the rubber. In case of using the co-crosslinking agent whose surface is treated with zinc stearate or the like, the cation component and anion component of zinc stearate or the like which is used as a surface treating agent are also included in the cation component and anion component of the component (e).

In the case that the rubber composition contains (e) the saturated fatty acid, a ratio ((component (d)+component (e))/component (b)) of a total of mole numbers of carboxyl groups (—COOH) and carboxylate groups (—COO$^-$) in the component (d) and in the component (e) to a total of mole numbers of carboxyl groups and carboxylate groups in the component (b) is preferably 0.01 or more, more preferably 0.02 or more, even more preferably 0.03 or more, and is preferably 0.26 or less, more preferably 0.25 or less, even more preferably 0.23 or less, most preferably 0.21 or less.

[(f) Metal Compound]

In the case that the rubber composition used in the present invention contains only the α,β-unsaturated carboxylic acid having 3 to 8 carbon atoms as the co-crosslinking agent, the rubber composition further contains (f) a metal compound as an essential component. (f) The metal compound is not particularly limited as long as it can neutralize (b) the α,β-unsaturated carboxylic acid having 3 to 8 carbon atoms in the rubber composition. (f) The metal compound includes, for example, a metal hydroxide such as magnesium hydroxide, zinc hydroxide, calcium hydroxide, sodium hydroxide, lithium hydroxide, potassium hydroxide, copper hydroxide, or the like; a metal oxide such as magnesium oxide, calcium oxide, zinc oxide, copper oxide, or the like; and a metal carbonate such as magnesium carbonate, zinc carbonate, calcium carbonate, sodium carbonate, lithium carbonate, potassium carbonate, or the like. (f) The metal compound is preferably a divalent metal compound, more preferably a zinc compound. This is because the divalent metal compound reacts with the α,β-unsaturated carboxylic acid having 3 to 8 carbon atoms, thereby forming a metal crosslinking. Further, use of the zinc compound provides a golf ball with a higher resilience. (f) The metal compound may be used solely or as a mixture of at least two of them. The amount of (f) the metal compound may be appropriately determined in accordance with the desired neutralization degree of (b) the α,β-unsaturated carboxylic acid having 3 to 8 carbon atoms and (d) the unsaturated fatty acid.

[(g) Organic Sulfur Compound]

The rubber composition used in the present invention preferably contains (g) an organic sulfur compound. If the rubber composition contains (g) the organic sulfur compound, the spherical core has a higher resilience.

(g) The organic sulfur compound is not particularly limited, as long as it is an organic compound having a sulfur atom in the molecule thereof. Examples of (g) the organic sulfur compound include an organic compound having a thiol group (—SH) or a polysulfide bond having 2 to 4 sulfur atoms (—S—S—, —S—S—S—, or —S—S—S—S—), and a metal salt thereof (—SM, —S-M-S—, —S-M-S—S—, —S—S-M-S—S—, —S-M-S—S—S—, or the like; M is a metal atom). Examples of the metal salt include a monovalent metal salt such as sodium, lithium, potassium, copper (I), and silver (I) or the like; and a divalent metal salt such as zinc, magnesium, calcium, strontium, barium, titanium (II), manganese (II), iron (II), cobalt (II), nickel (II), zirconium (II), tin (II) or the like. Furthermore, (g) the organic sulfur compound may be any one of an aliphatic compound (aliphatic thiol, aliphatic thiocarboxylic acid, aliphatic dithiocarboxylic acid, aliphatic polysulfide, or the like), heterocyclic compound, alicyclic compound (alicyclic thiol, alicyclic thiocarboxylic acid, alicyclic dithiocarboxylic acid, alicyclic polysulfide, or the like), and aromatic compound.

(g) The organic sulfur compound includes, for example, thiols (thiophenols and thionaphthols), polysulfides, thiurams, thiocarboxylic acids, dithiocarboxylic acids, sulfenamides, dithiocarbamates, and thiazoles.

Examples of the thiols include, for example, thiophenols and thionaphthols. The thiophenols include, for example, thiophenol; thiophenols substituted with a fluoro group, such as 4-fluorothiophenol, 2,5-difluorothiophenol, 2,6-difluorothiophenol, 2,4,5-trifluorothiophenol, 2,4,5,6-tetrafluorothiophenol, pentafluorothiophenol and the like; thiophenols substituted with a chloro group, such as 2-chlorothiophenol, 4-chlorothiophenol, 2,4-dichlorothiophenol, 2,5-dichlorothiophenol, 2,6-dichlorothiophenol, 2,4,5-trichlorothiophenol, 2,4,5,6-tetrachlorothiophenol, pentachlorothiophenol and the like; thiophenols substituted with a bromo group, such as 4-bromothiophenol, 2,5-dibromothiophenol, 2,6-dibromothiophenol, 2,4,5-tribromothiophenol, 2,4,5,6-tetrabromothiophenol, pentabromothiophenol and the like; thiophenols substituted with an iodo group, such as 4-iodothiophenol, 2,5-diiodothiophenol, 2,6-diiodothiophenol, 2,4,5-triiodothiophenol, 2,4,5,6-tetraiodothiophenol, pentaiodothiophenol and the like; or a metal salt thereof. As the metal salt, a zinc salt is preferred.

Examples of the thionaphthols (naphthalenethiols) include 2-thionaphthol, 1-thionaphthol, 1-chloro-2-thionaphthol, 2-chloro-1-thionaphthol, 1-bromo-2-thionaphthol, 2-bromo-1-thionaphthol, 1-fluoro-2-thionaphthol, 2-fluoro-1-thionaphthol, 1-cyano-2-thionaphthol, 2-cyano-1-thionaphthol, 1-acetyl-2-thionaphthol, 2-acetyl-1-thionaphthol, and a metal salt thereof. Preferable examples include 2-thionaphthol, 1-thionaphthol, and a metal salt thereof. The metal salt is preferably a divalent metal salt, more preferably a zinc salt. Specific examples of the metal salt include, for example, the zinc salt of 1-thionaphthol and the zinc salt of 2-thionaphthol.

The polysulfides are organic sulfur compounds having a polysulfide bond, and include, for example, disulfides, trisulfides, and tetrasulfides. The polysulfides preferably include diphenylpolysulfides.

Examples of the diphenylpolysulfides include diphenyldisulfide; diphenyldisulfides substituted with a halogen group, such as bis(4-fluorophenyl)disulfide, bis(2,5-difluorophenyl)disulfide, bis(2,6-difluorophenyl)disulfide, bis(2,4,5-trifluorophenyl)disulfide, bis(2,4,5,6-tetrafluorophenyl)disulfide, bis(pentafluorophenyl)disulfide, bis(4-chlorophenyl)disulfide, bis(2,5-dichlorophenyl)disulfide, bis(2,6-dichlorophenyl)disulfide, bis(2,4,5-trichlorophenyl)disulfide, bis(2,4,5,6-tetrachlorophenyl)disulfide, bis(pentachlorophenyl)disulfide, bis(4-bromophenyl)disulfide, bis(2,5-dibromophenyl)disulfide, bis(2,6-dibromophenyl)disulfide, bis(2,4,5-tribromophenyl)disulfide, bis(2,4,5,6-tetrabromophenyl)disulfide, bis(pentabromophenyl)disulfide, bis(4-iodophenyl)disulfide, bis(2,5-diiodophenyl)disulfide, bis(2,6-diiodophenyl)disulfide, bis(2,4,5-triiodophenyl)disulfide, bis(2,4,5,6-tetraiodophenyl)disulfide, and bis(pentaiodophenyl)disulfide; and diphenyldisulfides substituted with an alkyl group, such as bis(4-methylphenyl)disulfide, bis(2,4,5-trimethylphenyl)disulfide, bis(pentamethylphenyl)disulfide, bis(4-t-butylphenyl)disulfide, bis(2,4,5-tri-t-butylphenyl)disulfide, and bis(penta-t-butylphenyl)disulfide; and the like.

The thiurams include, for example, thiuram monosulfides such as tetramethylthiuram monosulfide; thiuram disulfides such as tetramethylthiuram disulfide, tetraethylthiuram disulfide, and tetrabutylthiuram disulfide; and thiuram tetrasulfides such as dipentamethylenethiuram tetrasulfide. The thiocarboxylic acids include, for example, a naphthalene thiocarboxylic acid. The dithiocarboxylic acids include, for example, a naphthalene dithiocarboxylic acid. The sulfenamides include, for example, N-cyclohexyl-2-benzothiazole sulfenamide, N-oxydiethylene-2-benzothiazole sulfenamide, and N-t-butyl-2-benzothiazole sulfenamide.

(g) The organic sulfur compound preferably includes thiophenols and/or the metal salt thereof, thionaphthols and/or the metal salt thereof, diphenyldisulfides, and thiuramdisulfides, more preferably includes 2,4-dichlorothiophenol, 2,6-difluorothiophenol, 2,6-dichlorothiophenol, 2,6-dibromothiophenol, 2,6-diiodothiophenol, 2,4,5-trichlorothiophenol, pentachlorothiophenol, 1-thionaphthol, 2-thionaphthol, diphenyldisulfide, bis(2,6-difluorophenyl)disulfide, bis(2,6-dichlorophenyl)disulfide, bis(2,6-dibromophenyl)disulfide, bis(2,6-diiodophenyl)disulfide, and bis(pentabromophenyl) disulfide.

(g) The organic sulfur compound may be used solely or in combination of at least two of them.

The amount of (g) the organic sulfur compound is preferably 0.05 part by mass or more, more preferably 0.1 part by mass or more, even more preferably 0.2 part by mass or more, and is preferably 5.0 parts by mass or less, more preferably 3.0 parts by mass or less, even more preferably 2.0 parts by mass or less, with respect to 100 parts by mass of (a) the base rubber. If the amount of (g) the organic sulfur compound is less than 0.05 part by mass, the effect of adding (g) the organic sulfur compound is not obtained, and thus the resilience of the golf ball may not improve. In addition, if the amount of (g) the organic sulfur compound exceeds 5.0 parts by mass, the obtained golf ball has an excessively large compression deformation amount, and thus the resilience thereof may be lowered.

[Rubber Composition]

In the spherical core, a ratio ((d)/(b)) of a total number of carbon-carbon double bonds in (d) the unsaturated fatty acid and/or the metal salt thereof to a total number of carbon-carbon double bonds in (b) the α,β-unsaturated carboxylic acid having 3 to 8 carbon atoms and/or the metal salt thereof is preferably 0.01 or more, more preferably 0.03 or more, even more preferably 0.06 or more, and is preferably 0.20 or less, more preferably 0.18 or less, even more preferably 0.16 or less. If the ratio ((d)/(b)) is 0.01 or more, the addition reaction between the component (d) and the component (b) occurs more easily, and thus the obtained spherical core has a higher resilience. On the other hand, if the ratio ((d)/(b)) is 0.20 or less, the durability of the golf ball is maintained without changing the compression deformation amount of the spherical core.

The carboxyl group of the spherical core preferably has a neutralization degree of 100 mole % or more, more preferably 105 mole % or more, even more preferably 108 mole % or more, most preferably 110 mole % or more, and preferably has a neutralization degree of 200 mole % or less, more preferably 180 mole % or less, even more preferably 170 mole % or less, most preferably 160 mole % or less. If the neutralization degree is 100 mole % or more, the durability of the golf ball is maintained without changing the compression deformation amount of the spherical core. On the other hand, if the neutralization degree is 200 mole % or less, the obtained spherical core does not become excessively soft, and thus the high resilience of the golf ball does not deteriorate. It is noted that the neutralization degree of the spherical core is defined by the following mathematical formula.

Neutralization degree (mole %)=100×[Σ(mole number of cation component×valence of cation component)]/[Σ(mole number of anion component×valence of anion component)]   [Mathematical formula 1]

In the mathematical formula 1, Σ(mole number of cation component×valence of cation component) is a sum of a product obtained by multiplying the mole number of the metal ion by the valence of the metal ion in the component (b), a product obtained by multiplying the mole number of the metal ion by the valence of the metal ion in the component (d), and a product obtained by multiplying the mole number of the metal ion by the valence of the metal ion in the component (f). It is noted that, when the rubber composition further contains the component (e), Σ(mole number of cation component×valence of cation component) further includes a product obtained by multiplying the mole number of the metal ion by the valence of the metal ion in the component (e).

In the mathematical formula 1, Σ(mole number of anion component×valence of anion component) is a sum of the mole number of the carboxyl group in the component (b) and the mole number of the carboxyl group in the component (d). It is noted that, when the rubber composition further contains the component (e), Σ(mole number of anion component×valence of anion component) further includes the mole number of the carboxyl group in the component (e).

The rubber composition used in the present invention may further contain additives such as a pigment, a filler for adjusting a weight or the like, an antioxidant, a peptizing agent, a softening agent or the like, where necessary. The pigment blended into the rubber composition, for example, includes a white pigment, a blue pigment, a purple pigment or the like.

As the white pigment, titanium oxide is preferably used. The type of titanium oxide is not particularly limited, but rutile type is preferably used because of the high opacity. In addition, the amount of titanium oxide is preferably 0.5 part by mass or more, more preferably 2 parts by mass or more, and is preferably 8 parts by mass or less, more preferably 5 parts by mass or less, with respect to 100 parts by mass of (a) the base rubber.

It is also preferred that the rubber composition contains both a white pigment and a blue pigment. The blue pigment is blended in order to cause white color to be vivid, and examples thereof include ultramarine blue, cobalt blue, and phthalocyanine blue. Examples of the purple pigment include anthraquinone violet, dioxazine violet, and methyl violet.

The amount of the blue pigment is preferably 0.001 part by mass or more, more preferably 0.05 part by mass or more, and is preferably 0.2 part by mass or less, more preferably 0.1 part by mass or less, with respect to 100 parts by mass of (a) the base rubber. If the amount of the blue pigment is less than 0.001 part by mass, blueness is insufficient, and the color looks yellowish. If the amount of the blue pigment exceeds 0.2 part by mass, blueness is excessively strong, and a vivid white appearance is not provided.

The filler blended in the rubber composition is used as a weight adjusting agent for mainly adjusting the weight of the golf ball obtained as a final product. The filler may be blended where necessary. The filler includes, for example, an inorganic filler such as zinc oxide, barium sulfate, calcium carbonate, magnesium oxide, tungsten powder, molybdenum powder, or the like. Zinc oxide is particularly preferably used as the filler. It is considered that zinc oxide functions as a vulcanization activator and increases the hardness of the entire core. The amount of the filler is preferably 0.5 part by mass or more, more preferably 1 part by mass or more, and is preferably 30 parts by mass or less, more preferably 25 parts by mass or less, even more preferably 20 parts by mass or less, with respect to 100 parts by mass of the base rubber. If the amount of the filler is less than 0.5 part by mass, it is difficult to adjust the weight, while if the amount of the filler exceeds 30 parts by mass, the weight ratio of the rubber component is reduced and thus the resilience tends to be lowered.

The amount of the antioxidant is preferably 0.1 part by mass or more and 1 part by mass or less with respect to 100 parts by mass of (a) the base rubber. In addition, the amount of the peptizing agent is preferably 0.1 part by mass or more and 5 parts by mass or less with respect to 100 parts by mass of (a) the base rubber.

[Spherical Core]

The spherical core preferably has a diameter of 34.8 mm or more, more preferably 36.8 mm or more, even more preferably 38.8 mm or more, and preferably has a diameter of 42.2 mm or less, more preferably 41.8 mm or less, even more preferably 41.2 mm or less, most preferably 40.8 mm or less. If the spherical core has a diameter of 34.8 mm or more, the thickness of the cover does not become too thick and thus the resilience becomes better. On the other hand, if the spherical core has a diameter of 42.2 mm or less, the thickness of the cover does not become too thin and thus the cover functions better.

When the spherical core has a diameter in a range from 34.8 mm to 42.2 mm, the compression deformation amount of the spherical core (shrinking amount of the spherical core along the compression direction) when applying a load from an initial load of 98 N to a final load of 1275 N is preferably 1.90 mm or more, more preferably 2.00 mm or more, even more preferably 2.10 mm or more, and is preferably 4.00 mm or less, more preferably 3.90 mm or less, even more preferably 3.80 mm or less. If the compression deformation amount is 1.90 mm or more, the shot feeling of the golf ball becomes better. If the compression deformation amount is 4.00 mm or less, the resilience of the golf ball becomes better.

The spherical core preferably has a structure represented by the chemical formula (4). If the spherical core has a structure represented by the chemical formula (4), the spherical core has a higher resilience. The carboxyl group in the molecule of the structure represented by the chemical formula (4) may be neutralized with a metal ion. In addition, the structure represented by the chemical formula (4) may form a metal crosslinking with other compound via the carboxyl group in the molecule thereof.

[Chemical formula 4]

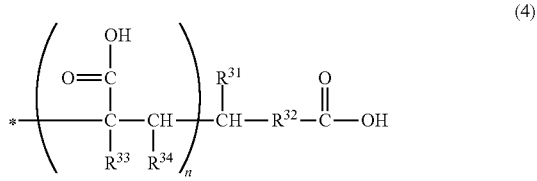

(4)

In the chemical formula (4), $R^{31}$ represents a hydrogen atom or an alkyl group having 1 to 25 carbon atoms, $R^{32}$ represents an alkylene group having 2 to 25 carbon atoms, $R^{33}$ represents a hydrogen atom or an alkyl group having 1 to 5 carbon atoms, $R^{34}$ represents a hydrogen atom, a carboxyl group or an alkyl group having 1 to 5 carbon atoms, * represents a location bonding to a carbon atom in (a) the base rubber, n represents a natural number of 1 or more, and when n is 2 or more, multiple $R^{33}$ and $R^{34}$ may be identical to or different from each other.

The alkyl group having 1 to 25 carbon atoms represented by $R^{31}$ may have a branched structure or a cyclic structure, but is preferably a linear alkyl group. The alkyl group $R^{31}$ preferably has 1 or more carbon atoms, more preferably 3 or more carbon atoms, even more preferably 5 or more carbon atoms, and preferably has 25 or less carbon atoms, more preferably 23 or less carbon atoms, even more preferably 21 or less carbon atoms.

The alkylene group having 2 to 25 carbon atoms represented by $R^{32}$ may have a branched structure or a cyclic structure, but is preferably a linear alkylene group. The alkylene group $R^{32}$ preferably has 2 or more carbon atoms, more preferably 4 or more carbon atoms, even more preferably 5 or more carbon atoms, and preferably has 25 or less carbon atoms, more preferably 23 or less carbon atoms, even more preferably 21 or less carbon atoms.

The alkyl group having 1 to 5 carbon atoms represented by $R^{33}$ may have a branched structure or a cyclic structure, but is preferably a linear alkyl group. The alkyl group $R^{33}$ preferably has 1 or more carbon atoms, more preferably 2 or more carbon atoms, even more preferably 3 or more carbon atoms, and preferably has 5 or less carbon atoms, more preferably 4 or less carbon atoms, even more preferably 3 or less carbon atoms.

The alkyl group having 1 to 5 carbon atoms represented by $R^{34}$ may have a branched structure or a cyclic structure, but is preferably a linear alkyl group. The alkyl group $R^{34}$ preferably has 1 or more carbon atoms, more preferably 2 or more carbon atoms, even more preferably 3 or more carbon atoms, and preferably has 5 or less carbon atoms, more preferably 4 or less carbon atoms, even more preferably 3 or less carbon atoms.

In the chemical formula (4), a total number of carbon atoms in $R^{33}$ and carbon atoms in $R^{34}$ is preferably 5 or less, more preferably 4 or less, even more preferably 3 or less.

In the chemical formula (4), in the case that $R^{31}$ is an alkyl group, a total number of carbon atoms in $R^{31}$ and carbon atoms in $R^{32}$ is preferably 8 or more, more preferably 10 or more, even more preferably 12 or more, and is preferably 28 or less, more preferably 26 or less, even more preferably 24 or less. If a total number of carbon atoms falls within the above range, the obtained spherical core has a higher resilience.

In addition, in the chemical formula (4), in the case that $R^{31}$ is an alkyl group, a ratio ($R^{31}/R^{32}$) of carbon atom number in $R^{31}$ to carbon atom number in $R^{32}$ is preferably 0.1 or more, more preferably 0.5 or more, even more preferably 0.8 or more, and is preferably 10.0 or less, more preferably 5.0 or less, even more preferably 1.3 or less. If the ratio ($R^{31}/R^{32}$) of carbon atom number falls within the above range, the obtained spherical core has a higher resilience.

[Cover]

The cover of the golf ball of the present invention is formed from a cover composition containing a resin component. Examples of the resin component include, for example, an ionomer resin; a thermoplastic polyurethane elastomer having a trade name of "Elastollan (registered trademark)" available from BASF Japan Ltd.; a thermoplastic polyamide elastomer having a trade name of "Pebax (registered trademark)" available from Arkema K. K.; a thermoplastic polyester elastomer having a trade name of "Hytrel (registered trademark)" available from Du Pont-Toray Co., Ltd.; and a thermoplastic styrene elastomer having a trade name of "Rabalon (registered trademark)" available from Mitsubishi Chemical Corporation; and the like.

The ionomer resin includes, for example, a product prepared by neutralizing at least a part of carboxyl groups in a binary copolymer composed of an olefin and an α,β-unsaturated carboxylic acid having 3 to 8 carbon atoms with a metal ion; a product prepared by neutralizing at least a part of carboxyl groups in a ternary copolymer composed of an olefin, an α,β-unsaturated carboxylic acid having 3 to 8 carbon atoms and an α,β-unsaturated carboxylic acid ester with a metal ion, or a mixture of those. The olefin preferably includes an olefin having 2 to 8 carbon atoms. Examples of the olefin include ethylene, propylene, butene, pentene, hexene, heptene, and octene. The olefin more preferably includes ethylene. Examples of the α,β-unsaturated carboxylic acid having 3 to 8 carbon atoms include acrylic acid, methacrylic acid, fumaric acid, maleic acid and crotonic acid. Among these, acrylic acid and methacrylic acid are particularly preferred. Examples of the α,β-unsaturated carboxylic acid ester include methyl ester, ethyl ester, propyl ester, n-butyl ester, isobutyl ester of acrylic acid, methacrylic acid, fumaric acid, maleic acid or the like. In particular, acrylic acid ester and methacrylic acid ester are preferred. Among these, the ionomer resin preferably includes a metal ion-neutralized product of a binary copolymer composed of ethylene and (meth)acrylic acid, and a metal ion-neutralized product of a ternary copolymer composed of ethylene, (meth)acrylic acid and (meth)acrylic acid ester.

Specific examples of the ionomer resin include trade name "Himilan (registered trademark) (e.g. the binary copolymerized ionomer resin such as Himilan 1555 (Na), Himilan 1557 (Zn), Himilan 1605 (Na), Himilan 1706 (Zn), Himilan 1707 (Na), Himilan AM3711 (Mg); and the ternary copolymerized ionomer resin such as Himilan 1856 (Na), Himilan 1855 (Zn))" available from Du Pont-Mitsui Polychemicals Co., Ltd.

Further, examples of the ionomer resin also include "Surlyn (registered trademark) (e.g. the binary copolymerized ionomer resin such as Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li); and the ternary copolymerized ionomer resin such as Surlyn 8120 (Na), Surlyn 8320 (Na), Surlyn 9320 (Zn), Surlyn 6320 (Mg), HPF 1000 (Mg), HPF 2000 (Mg))" available from E.I. du Pont de Nemours and Company.

Further, examples of the ionomer resin also include "Iotek (registered trademark) (e.g. the binary copolymerized ionomer resin such as Iotek 8000 (Na), Iotek 8030 (Na), Iotek 7010 (Zn), Iotek 7030 (Zn); and the ternary copolymerized ionomer resin such as Iotek 7510 (Zn), Iotek 7520 (Zn))" available from ExxonMobil Chemical Corporation.

It is noted that Na, Zn, Li, Mg or the like described in the parentheses after the trade name of the ionomer resin indicates a metal ion type for neutralizing the ionomer resin. The ionomer resin may be used solely or in combination at least two of them.

The cover composition constituting the cover of the golf ball of the present invention preferably contains, as a resin component, a thermoplastic polyurethane elastomer or an ionomer resin. In case of using the ionomer resin, it is preferred to use a thermoplastic styrene elastomer together. The amount of the polyurethane or ionomer resin in the resin component of the cover composition is preferably 50 mass % or more, more preferably 60 mass % or more, even more preferably 70 mass % or more.

In addition to the above resin component, the cover composition may further contain a pigment component such as a white pigment (e.g. titanium oxide), a blue pigment and a red pigment; a weight adjusting agent such as zinc oxide, calcium carbonate and barium sulfate; a dispersant; an antioxidant; an ultraviolet absorber; a light stabilizer; a fluorescent material or a fluorescent brightener; and the like, as long as they do not impair the performance of the cover.

The amount of the white pigment (e.g. titanium oxide) is preferably 0.5 part by mass or more, more preferably 1 part by mass or more, and is preferably 10 parts by mass or less, more preferably 8 parts by mass or less, with respect to 100 parts by mass of the resin component constituting the cover. If the amount of the white pigment is 0.5 part by mass or more, it is possible to impart the opacity to the cover. Further, if the amount of the white pigment exceeds 10 parts by mass, the durability of the obtained cover may deteriorate.

It is preferred that the slab hardness of the cover composition is appropriately set in accordance with the desired performance of the golf ball. For example, in case of a so-called distance golf ball which focuses on a flight distance, the cover composition preferably has a slab hardness of 50 or more, more preferably 55 or more, even more preferably 60 or more, and preferably has a slab hardness of 80 or less, more preferably 70 or less, even more preferably 68 or less in Shore D hardness. If the cover composition has a slab hardness of 50 or more, the obtained golf ball has a higher launch angle and lower spin rate on driver shots and iron shots, and thus travels a greater flight distance. Further, if the cover composition has a slab hardness of 80 or less, the golf ball excellent in durability is obtained. In addition, in case of a so-called spin golf ball which focuses on controllability, the cover composition preferably has a slab hardness of less than 50, and preferably has a slab hardness of 20 or more, more preferably 25 or more, even more preferably 30 or more in Shore D hardness. If the cover composition has a slab hardness of less than 50 in Shore D hardness, the flight distance on driver shots can be improved by the core of the present invention, as well as the obtained golf ball readily stops on the green due to the high spin rate on approach shots. Further, if the cover composition has a slab hardness of 20 or more, the abrasion resistance becomes better. In case of a plurality of cover layers, the slab hardness of the cover composition constituting each layer may be identical to or different from each other, as long as the slab hardness of each layer falls within the above range.

The method for molding the cover of the golf ball of the present invention, for example, includes a method which comprises molding the cover composition into a hollow-shell, covering the core with a plurality of the hollow-shells and subjecting the core with a plurality of the hollow shells to the compression molding (preferably a method which comprises molding the cover composition into a half hollow-shell, covering the core with two of the half hollow-shells, and subjecting the core with two of the half hollow-shells to the compression molding); and a method which comprises injection molding the cover composition directly onto the core.

When molding the cover in the compression molding method, molding of the half shell may be conducted by either a compression molding method or an injection molding method, but the compression molding method is preferred. The compression molding of the cover composition into the half shell can be carried out, for example, under a pressure of 1 MPa or more and 20 MPa or less at a temperature of −20° C. or more and 70° C. or less relative to the flow beginning temperature of the cover composition. By performing the molding under the above conditions, a half shell having a uniform thickness can be formed. Examples of the method for molding the cover using half shells include a method of covering the core with two of the half shells and then subjecting the core with two of the half shells to the compression molding. The compression molding of the half shells into the cover can be carried out, for example, under a pressure of 0.5 MPa or more and 25 MPa or less at a temperature of −20° C. or more and 70° C. or less relative to the flow beginning temperature of the cover composition. By performing the molding under the above conditions, a golf ball cover having a uniform thickness can be formed.

In case of injection molding the cover composition into the cover, the cover composition extruded in a pellet form beforehand may be used for the injection molding, or the cover materials such as the base resin components and the pigment may be dry blended, followed by directly injection molding the blended material. It is preferred to use upper and lower molds having a hemispherical cavity and pimples for forming the cover, wherein a part of the pimples also serves as a retractable hold pin. When molding the cover by the injection molding, the hold pin is protruded to hold the core, and the cover composition is charged and then cooled to obtain the cover. For example, the molding of the cover may be conducted as follows: the cover composition heated to a temperature ranging from 200° C. to 250° C. is charged for 0.5 to 5 seconds into a mold held under a pressure of 9 MPa to 15 MPa, and after cooling for 10 to 60 seconds, the mold is opened.

When molding the cover, concave portions called "dimple" are usually formed on the surface of the cover. The total number of dimples formed on the cover is preferably 200 or more and 500 or less. If the total number is less than 200, the dimple effect is hardly obtained. On the other hand, if the total number exceeds 500, the dimple effect is hardly obtained because the size of the respective dimples is small. The shape (shape in a plan view) of dimples includes, for example, without limitation, a circle, a polygonal shape such as a roughly triangular shape, a roughly quadrangular shape, a roughly pentagonal shape, a roughly hexagonal shape, and other irregular shape. The shape of dimples is employed solely or at least two of them may be used in combination.

The thickness of the cover is preferably 4.0 mm or less, more preferably 3.0 mm or less, even more preferably 2.0 mm or less. If the thickness of the cover is 4.0 mm or less, the resilience and shot feeling of the obtained golf ball become better. The thickness of the cover is preferably 0.3 mm or more, more preferably 0.5 mm or more, and even more preferably 0.8 mm or more, most preferably 1.0 mm or more. If the thickness of the cover is less than 0.3 mm, the durability and wear resistance of the cover may deteriorate. In the case that the cover has a plurality of layers, it is preferred that the total thickness of the cover layers falls within the above range.

The golf ball body having the cover formed thereon is ejected from the mold, and is preferably subjected to surface treatments such as deburring, cleaning and sandblast where necessary. In addition, if desired, a paint film or a mark may be formed. The paint film preferably has a thickness of, but is not particularly limited to, 5 µm or more, more preferably 7 µm or more, and preferably has a thickness of 50 µm or less, more preferably 40 µm or less, even more preferably 30 µm or less. If the thickness of the paint film is less than 5 µm, the paint film is easy to wear off due to the continued use of the golf ball, and if the thickness of the paint film exceeds 50 µm, the dimple effect is reduced and thus the flight performance of the golf ball may be lowered.

[Golf Ball]

The golf ball construction of the present invention is not particularly limited, as long as the golf ball comprises a spherical core and at least one cover covering the spherical core. FIG. 1 is a partially cutaway sectional view showing a golf ball 2 according to an embodiment of the present invention. The golf ball 2 comprises a spherical core 4, and a cover 12 covering the spherical core 4. A plurality of dimples 14 are formed on the surface of the cover. Other portion than the dimples 14 on the surface of the golf ball 2 is a land 16. The golf ball 2 is provided with a paint layer and a mark layer outside the cover 12, but these layers are not depicted.

The spherical core preferably has a single layered structure. Unlike the multi-layered structure, the spherical core of the single layered structure does not have energy loss at the interface of the multi-layered structure when being hit, and thus has a higher resilience. In addition, the cover has a structure of at least one layer, for example, a single layered structure, or a multi-layered structure of at least two layers. The golf ball of the present invention includes, for example, a two-piece golf ball comprising a spherical core and a single layered cover disposed around the spherical core; a multi-piece golf ball (including a three-piece golf ball) comprising a spherical core and at least two cover layers disposed around the spherical core; and a wound golf ball comprising a spherical core, a rubber thread layer which is formed around the spherical core, and a cover disposed over the rubber thread layer. The present invention can be suitably applied to any one of the above golf ball.

The golf ball of the present invention preferably has a diameter ranging from 40 mm to 45 mm. In light of satisfying a regulation of US Golf Association (USGA), the diameter is particularly preferably 42.67 mm or more. In light of prevention of air resistance, the diameter is more preferably 44 mm or less, particularly preferably 42.80 mm or less. In addition, the golf ball of the present invention preferably has a mass of 40 g or more and 50 g or less. In light of obtaining greater inertia, the mass is more preferably 44 g or more, particularly preferably 45.00 g or more. In light of satisfying a regulation of USGA, the mass is particularly preferably 45.93 g or less.

When the golf ball of the present invention has a diameter in a range from 40 mm to 45 mm, the compression deformation amount of the golf ball (shrinking amount of the golf ball along the compression direction) when applying a load from 98 N as an initial load to 1275 N as a final load to the golf ball is preferably 2.0 mm or more, more preferably 2.2 mm or more, even more preferably 2.4 mm or more, and is preferably 4.0 mm or less, more preferably 3.5 mm or less, even more preferably 3.4 mm or less. If the compression deformation amount is 2.0 mm or more, the golf ball does not become excessively hard, and thus the shot feeling thereof becomes better. On the other hand, if the compression deformation amount is 4.0 mm or less, the resilience of the golf ball becomes higher.

EXAMPLES

Next, the present invention will be described in detail by way of examples. However, the present invention is not limited to the examples described below. Various changes and modifications without departing from the spirit of the present invention are included in the scope of the present invention.

[Evaluation Methods]
(1) Compression Deformation Amount

A compression deformation amount of the core or golf ball (a shrinking amount of the core or golf ball along the compression direction), when applying a load from an initial load of 98 N to a final load of 1275 N to the core or golf ball, was measured.

(2) Coefficient of Restitution

A metal cylindrical object with a mass of 198.4 g was allowed to collide with each core or golf ball at a speed of 40 m/sec, and the speeds of the cylindrical object and the core or golf ball before and after the collision were measured. Based on these speeds and the mass of each object, the coefficient of restitution of each core or golf ball was calculated. The measurement was conducted using twelve samples for each core or golf ball, and the average value thereof was adopted as the coefficient of restitution for that core or golf ball. It is noted that the coefficient of restitution in Tables 1 to 4 is shown as a difference from the coefficient of restitution of the golf ball No. 30, and the coefficient of restitution in Tables 5 to 10 is shown as a difference from the coefficient of restitution of the golf ball No. 72.

(3) Slab Hardness (Shore D Hardness)

Sheets with a thickness of about 2 mm were produced by injection molding the cover composition. The sheets were stored at 23° C. for two weeks. At least three of these sheets were stacked on one another so as not to be affected by the measuring substrate on which the sheets were placed, and the hardness of the stack was measured with an automatic hardness tester (Digitest II, available from Bareiss company) using a testing device of "Shore D".

(4) Flight Distance on Driver Shots

A W #1 driver provided with a metal head (XXIO S, loft angel: 11°, available from Dunlop Sports Limited) was installed on a swing robot M/C available from Golf Laboratories, Inc. The golf ball was hit at a head speed of 40 m/sec, and the flight distance (the distance from the launch point to the stop point) thereof was measured. The measurement was conducted twelve times for each golf ball, and the average value thereof was adopted as the measurement value for that golf ball. It is noted that the flight distance of each golf ball in Tables 1 to 4 is shown as a difference from the flight distance of the golf ball No. 30 (flight distance difference=flight distance of each golf ball−flight distance of golf ball No. 30), and the flight distance of each golf ball in Tables 5 to 10 is shown as a difference from the flight distance of the golf ball No. 72 (flight distance difference=flight distance of each golf ball−flight distance of golf ball No. 72).

(5) Durability

A W #1 driver provided with a metal head (XXIO S, loft angel: 11°, available from Dunlop Sports Limited) was installed on a swing robot M/C available from Golf Laboratories, Inc. The golf ball was hit repeatedly at a head speed of 45 m/sec until a crack occurred, and the hitting number when the crack occurred was counted. The measurement was conducted using twelve samples for each golf ball, and the average value thereof was adopted as the hitting number for that golf ball. It is noted that the difference between the hitting number of each golf ball and the hitting number of the golf ball No. 30 (hitting number difference=hitting number of each golf ball−hitting number of golf ball No. 30) in Tables 1 to 4 was calculated, and the durability was evaluated according to the following standard, and the difference between the hitting number of each golf ball and the hitting number of the golf ball No. 72 (hitting number difference=hitting number of each golf ball−hitting number of golf ball No. 72) in Tables 5 to 10 was calculated, and the durability was evaluated according to the following standard.

Evaluation Standard

G (Good): The hitting number difference is 0 or more.
P (Poor): The hitting number difference is less than 0.

[Production of Golf Ball]
(1) Production of Core

The rubber compositions having the formulations shown in Tables 1 to 10 were kneaded with a kneading roll, and heat pressed in upper and lower molds, each having a hemispherical cavity, at 170° C. for 20 minutes to obtain spherical cores having a diameter of 39.8 mm. It is noted that barium sulfate was added in an appropriate amount such that the obtained golf balls have a mass of 45.4 g.

TABLE 1

| | | | Golf ball No. | | | | | | |
|---|---|---|---|---|---|---|---|---|---|
| | | | 1 | 2 | 3 | 4 | 5 | 6 | 7 |
| Rubber composition | Amount (parts by mass) | BR730 | 100 | 100 | 100 | 100 | 100 | 100 | 100 |
| | | ZN-DA90S | 28 | 28 | 28 | 31 | 32 | 34 | 39 |
| | | Dicumyl peroxide | 0.8 | 0.8 | 0.8 | 0.8 | 0.8 | 0.8 | 0.8 |
| | | Zinc oxide | 3.3 | 3.6 | 4.0 | 5.3 | 6.3 | 7.5 | 9.9 |
| | | PBDS | 0.63 | 0.63 | 0.63 | 0.63 | 0.63 | 0.63 | 0.63 |
| | | Barium sulfate | Appropriate amount | Appropriate amount | Appropriate amount | Appropriate amount | Appropriate amount | Appropriate amount | Appropriate amount |
| | | Oleic acid | 1 | 3 | 5 | 10 | 15 | 20 | 30 |
| | | Zinc oleate | — | — | — | — | — | — | — |
| | | Stearic acid | — | — | — | — | — | — | — |
| | | Zinc stearate | — | — | — | — | — | — | — |
| | | Linoleic acid | — | — | — | — | — | — | — |
| | | Linolenic acid | — | — | — | — | — | — | — |
| | | Stearidonic acid | — | — | — | — | — | — | — |
| | Amount of carbon-carbon double bond in component (d) (mmol/g) | | 3.54 | 3.54 | 3.54 | 3.54 | 3.54 | 3.54 | 3.54 |
| | Ratio of a total of carbon-carbon double bonds ((d)/(b)) | | 0.01 | 0.04 | 0.07 | 0.13 | 0.19 | 0.24 | 0.31 |
| | Neutralization degree (mole %) | | 130 | 130 | 130 | 130 | 130 | 130 | 130 |
| Spherical core | Compression deformation amount (mm) | | 3.8 | 3.8 | 3.8 | 3.8 | 3.8 | 3.8 | 3.8 |
| | Coefficient of restitution | | 0.003 | 0.007 | 0.010 | 0.005 | 0.002 | −0.015 | −0.030 |
| Cover | Slab hardness (Shore D) | | 65 | 65 | 65 | 65 | 65 | 65 | 65 |
| | Thickness (mm) | | 1.5 | 1.5 | 1.5 | 1.5 | 1.5 | 1.5 | 1.5 |

TABLE 1-continued

| Golf ball | Compression deformation amount (mm) | 3.3 | 3.3 | 3.3 | 3.3 | 3.3 | 3.3 | 3.3 |
|---|---|---|---|---|---|---|---|---|
| | Coefficient of restitution | 0.003 | 0.007 | 0.010 | 0.005 | 0.002 | −0.015 | −0.030 |
| | Flight distance on driver shots (yd) | 0.7 | 1.2 | 1.7 | 1.0 | 0.3 | −2.5 | −5.0 |
| | Durability | G | G | G | G | G | G | G |

TABLE 2

| | | | Golf ball No. | | | | | | | |
|---|---|---|---|---|---|---|---|---|---|---|
| | | | 8 | 9 | 10 | 11 | 12 | 13 | 14 | 15 |
| Rubber composition | Amount (parts by mass) | BR730 | 100 | 100 | 100 | 100 | 100 | 100 | 100 | 100 |
| | | ZN-DA90S | 28 | 28 | 28 | 28 | 28 | 28 | 28 | 28 |
| | | Dicumyl peroxide | 0.8 | 0.8 | 0.8 | 0.8 | 0.8 | 0.8 | 0.8 | 0.8 |
| | | Zinc oxide | 0.7 | 1.8 | 2.9 | 5.1 | 6.2 | 7.3 | 9.5 | 11.7 |
| | | PBDS | 0.63 | 0.63 | 0.63 | 0.63 | 0.63 | 0.63 | 0.63 | 0.63 |
| | | Barium sulfate | Appropriate amount | Appropriate amount | Appropriate amount | Appropriate amount | Appropriate amount | Appropriate amount | Appropriate amount | Appropriate amount |
| | | Oleic acid | 5 | 5 | 5 | 5 | 5 | 5 | 5 | 5 |
| | | Zinc oleate | — | — | — | — | — | — | — | — |
| | | Stearic acid | — | — | — | — | — | — | — | — |
| | | Zinc stearate | — | — | — | — | — | — | — | — |
| | | Linoleic acid | — | — | — | — | — | — | — | — |
| | | Linolenic acid | — | — | — | — | — | — | — | — |
| | | Stearidonic acid | — | — | — | — | — | — | — | — |
| | Amount of carbon-carbon double bond in component (d) (mmol/g) | | 3.54 | 3.54 | 3.54 | 3.54 | 3.54 | 3.54 | 3.54 | 3.54 |
| | Ratio of a total of carbon-carbon double bonds ((d)/(b)) | | 0.07 | 0.07 | 0.07 | 0.07 | 0.07 | 0.07 | 0.07 | 0.07 |
| | Neutralization degree (mole %) | | 100 | 110 | 120 | 140 | 150 | 160 | 180 | 200 |
| Spherical core | Compression deformation amount (mm) | | 3.8 | 3.8 | 3.8 | 3.8 | 3.8 | 3.8 | 3.8 | 3.8 |
| | Coefficient of restitution | | 0.006 | 0.007 | 0.008 | 0.007 | 0.004 | 0.002 | −0.003 | −0.007 |
| Cover | Slab hardness (Shore D) | | 65 | 65 | 65 | 65 | 65 | 65 | 65 | 65 |
| | Thickness (mm) | | 1.5 | 1.5 | 1.5 | 1.5 | 1.5 | 1.5 | 1.5 | 1.5 |
| Golf ball | Compression deformation amount (mm) | | 3.3 | 3.3 | 3.3 | 3.3 | 3.3 | 3.3 | 3.3 | 3.3 |
| | Coefficient of restitution | | 0.006 | 0.007 | 0.008 | 0.007 | 0.004 | 0.002 | −0.003 | −0.007 |
| | Flight distance on driver shots (yd) | | 1.0 | 1.2 | 1.3 | 1.2 | 0.7 | 0.3 | −0.7 | −1.2 |
| | Durability | | G | G | G | G | G | G | G | G |

TABLE 3

| | | | Golf ball No. | | | | | | |
|---|---|---|---|---|---|---|---|---|---|
| | | | 16 | 17 | 18 | 19 | 20 | 21 | 22 |
| Rubber composition | Amount (parts by mass) | BR730 | 100 | 100 | 100 | 100 | 100 | 100 | 100 |
| | | ZN-DA90S | 28 | 28 | 31 | 28 | 28 | 28 | 28 |
| | | Dicumyl peroxide | 0.8 | 0.8 | 0.8 | 0.8 | 0.8 | 0.8 | 0.8 |
| | | Zinc oxide | 3.2 | 3.3 | 3.8 | 4.0 | 4.9 | 3.3 | 3.5 |
| | | PBDS | 0.63 | 0.63 | 0.63 | 0.63 | 0.63 | 0.63 | 0.63 |
| | | Barium sulfate | Appropriate amount | Appropriate amount | Appropriate amount | Appropriate amount | Appropriate amount | Appropriate amount | Appropriate amount |
| | | Oleic acid | — | — | — | — | — | — | — |
| | | Zinc oleate | 3 | 5 | 10 | — | — | — | — |
| | | Stearic acid | — | — | — | 5 | 10 | — | — |
| | | Zinc stearate | — | — | — | — | — | 5 | 10 |
| | | Linoleic acid | — | — | — | — | — | — | — |
| | | Linolenic acid | — | — | — | — | — | — | — |
| | | Stearidonic acid | — | — | — | — | — | — | — |
| | Amount of carbon-carbon double bond in component (d) (mmol/g) | | 3.18 | 3.18 | 3.18 | — | — | — | — |
| | Ratio of a total of carbon-carbon double bonds ((d)/(b)) | | 0.04 | 0.07 | 0.12 | — | — | — | — |
| | Neutralization degree (mole %) | | 130 | 130 | 130 | 130 | 130 | 130 | 130 |
| Spherical core | Compression deformation amount (mm) | | 3.8 | 3.8 | 3.8 | 3.8 | 3.8 | 3.8 | 3.8 |
| | Coefficient of restitution | | 0.007 | 0.010 | 0.005 | 0.000 | 0.000 | 0.000 | 0.000 |

TABLE 3-continued

| | | | | | | | | |
|---|---|---|---|---|---|---|---|---|
| Cover | Slab hardness (Shore D) | 65 | 65 | 65 | 65 | 65 | 65 | 65 |
| | Thickness (mm) | 1.5 | 1.5 | 1.5 | 1.5 | 1.5 | 1.5 | 1.5 |
| Golf ball | Compression deformation amount (mm) | 3.3 | 3.3 | 3.3 | 3.3 | 3.3 | 3.3 | 3.3 |
| | Coefficient of restitution | 0.007 | 0.010 | 0.005 | 0.000 | 0.000 | 0.000 | 0.000 |
| | Flight distance on driver shots (yd) | 1.2 | 1.7 | 1.0 | 0.0 | 0.0 | 0.0 | 0.0 |
| | Durability | G | G | G | G | G | G | G |

TABLE 4

| | | | Golf ball No. | | | | | | | |
|---|---|---|---|---|---|---|---|---|---|---|
| | | | 23 | 24 | 25 | 26 | 27 | 28 | 29 | 30 |
| Rubber composition | Amount (parts by mass) | BR730 | 100 | 100 | 100 | 100 | 100 | 100 | 100 | 100 |
| | | ZN-DA90S | 28 | 28 | 28 | 28 | 28 | 28 | 28 | 28 |
| | | Dicumyl peroxide | 0.8 | 0.8 | 0.8 | 0.8 | 0.8 | 0.8 | 0.8 | 0.8 |
| | | Zinc oxide | 3.6 | 4.0 | 5.0 | 4.0 | 5.0 | 4.0 | 5.0 | 5.0 |
| | | PBDS | 0.63 | 0.63 | 0.63 | 0.63 | 0.63 | 0.63 | 0.63 | 0.63 |
| | | Barium sulfate | Appropriate amount | Appropriate amount | Appropriate amount | Appropriate amount | Appropriate amount | Appropriate amount | Appropriate amount | Appropriate amount |
| | | Oleic acid | — | — | — | — | — | — | — | — |
| | | Zinc oleate | — | — | — | — | — | — | — | — |
| | | Stearic acid | — | — | — | — | — | — | — | — |
| | | Zinc stearate | — | — | — | — | — | — | — | — |
| | | Linoleic acid | 3 | 5 | 10 | — | — | — | — | — |
| | | Linolenic acid | — | — | — | 5 | 10 | — | — | — |
| | | Stearidonic acid | — | — | — | — | — | 5 | 10 | — |
| | Amount of carbon-carbon double bond in component (d) (mmol/g) | | 7.13 | 7.13 | 7.13 | 10.77 | 10.77 | 14.47 | 14.47 | — |
| | Ratio of a total of carbon-carbon double bonds ((d)/(b)) | | 0.09 | 0.15 | 0.29 | 0.22 | 0.44 | 0.30 | 0.60 | — |
| | Neutralization degree (mole %) | | 130 | 130 | 130 | 130 | 130 | 130 | 130 | 150 |
| Spherical core | Compression deformation amount (mm) | | 3.8 | 3.8 | 3.8 | 3.8 | 3.8 | 3.8 | 3.8 | 3.8 |
| | Coefficient of restitution | | 0.001 | 0.004 | 0.000 | 0.000 | 0.000 | 0.000 | 0.000 | Standard |
| Cover | Slab hardness (Shore D) | | 65 | 65 | 65 | 65 | 65 | 65 | 65 | 65 |
| | Thickness (mm) | | 1.5 | 1.5 | 1.5 | 1.5 | 1.5 | 1.5 | 1.5 | 1.5 |
| Golf ball | Compression deformation amount (mm) | | 3.3 | 3.3 | 3.3 | 3.3 | 3.3 | 3.3 | 3.3 | 3.3 |
| | Coefficient of restitution | | 0.001 | 0.004 | 0.000 | 0.000 | 0.000 | 0.000 | 0.000 | Standard |
| | Flight distance on driver shots (yd) | | 0.2 | 0.7 | 0.0 | 0.0 | 0.0 | 0.0 | 0.0 | Standard |
| | Durability | | G | G | P | G | P | G | P | G |

TABLE 5

| | | | Golf ball No. | | | | | | |
|---|---|---|---|---|---|---|---|---|---|
| | | | 31 | 32 | 33 | 34 | 35 | 36 | 37 |
| Rubber composition | Amount (parts by mass) | BR730 | 100 | 100 | 100 | 100 | 100 | 100 | 100 |
| | | ZN-DA90S | 28 | 28 | 28 | 31 | 32 | 34 | 39 |
| | | Dicumyl peroxide | 0.8 | 0.8 | 0.8 | 0.8 | 0.8 | 0.8 | 0.8 |
| | | Zinc oxide | 3.3 | 3.6 | 4.0 | 5.3 | 6.3 | 7.5 | 9.9 |
| | | PBDS | 0.63 | 0.63 | 0.63 | 0.63 | 0.63 | 0.63 | 0.63 |
| | | Barium sulfate | Appropriate amount | Appropriate amount | Appropriate amount | Appropriate amount | Appropriate amount | Appropriate amount | Appropriate amount |
| | | Oleic acid | 1 | 3 | 5 | 10 | 15 | 20 | 30 |
| | | Zinc oleate | — | — | — | — | — | — | — |
| | | Myristoleic acid | — | — | — | — | — | — | — |
| | | Palmitoleic acid | — | — | — | — | — | — | — |
| | | Eicosenoic acid | — | — | — | — | — | — | — |
| | | Erucic acid | — | — | — | — | — | — | — |
| | | Nervonic acid | — | — | — | — | — | — | — |
| | | Elaidic acid | — | — | — | — | — | — | — |
| | | 10-Undecylenic acid | — | — | — | — | — | — | — |

TABLE 5-continued

|  |  |  |  |  |  |  |  |  |
|---|---|---|---|---|---|---|---|---|
|  | Stearic acid | — | — | — | — | — | — | — |
|  | Zinc stearate | — | — | — | — | — | — | — |
|  | Ratio of carboxyl group and carboxylate group ((d + e)/(b)) | 0.05 | 0.08 | 0.11 | 0.17 | 0.23 | 0.28 | 0.35 |
|  | Neutralization degree (mole %) | 130 | 130 | 130 | 130 | 130 | 130 | 130 |
| Spherical core | Compression deformation amount (mm) | 3.8 | 3.8 | 3.8 | 3.8 | 3.8 | 3.8 | 3.8 |
|  | Coefficient of restitution | 0.003 | 0.007 | 0.010 | 0.005 | 0.002 | −0.015 | −0.030 |
| Cover | Slab hardness (Shore D) | 65 | 65 | 65 | 65 | 65 | 65 | 65 |
|  | Thickness (mm) | 1.5 | 1.5 | 1.5 | 1.5 | 1.5 | 1.5 | 1.5 |
| Golf ball | Compression deformation amount (mm) | 3.3 | 3.3 | 3.3 | 3.3 | 3.3 | 3.3 | 3.3 |
|  | Coefficient of restitution | 0.003 | 0.007 | 0.010 | 0.005 | 0.002 | −0.015 | −0.030 |
|  | Flight distance on driver shots (yd) | 0.7 | 1.2 | 1.7 | 1.0 | 0.3 | −2.5 | −5.0 |
|  | Durability | G | G | G | G | G | G | G |

TABLE 6

|  |  |  | Golf ball No. | | | | | | | |
|---|---|---|---|---|---|---|---|---|---|---|
|  |  |  | 38 | 39 | 40 | 41 | 42 | 43 | 44 | 45 |
| Rubber composition | Amount (parts by mass) | BR730 | 100 | 100 | 100 | 100 | 100 | 100 | 100 | 100 |
|  |  | ZN-DA90S | 28 | 28 | 28 | 28 | 28 | 28 | 28 | 28 |
|  |  | Dicumyl peroxide | 0.8 | 0.8 | 0.8 | 0.8 | 0.8 | 0.8 | 0.8 | 0.8 |
|  |  | Zinc oxide | 0.7 | 1.8 | 2.9 | 5.1 | 6.2 | 7.3 | 9.5 | 11.7 |
|  |  | PBDS | 0.63 | 0.63 | 0.63 | 0.63 | 0.63 | 0.63 | 0.63 | 0.63 |
|  |  | Barium sulfate | Appropriate amount | Appropriate amount | Appropriate amount | Appropriate amount | Appropriate amount | Appropriate amount | Appropriate amount | Appropriate amount |
|  |  | Oleic acid | 5 | 5 | 5 | 5 | 5 | 5 | 5 | 5 |
|  |  | Zinc oleate | — | — | — | — | — | — | — | — |
|  |  | Myristoleic acid | — | — | — | — | — | — | — | — |
|  |  | Palmitoleic acid | — | — | — | — | — | — | — | — |
|  |  | Eicosenoic acid | — | — | — | — | — | — | — | — |
|  |  | Erucic acid | — | — | — | — | — | — | — | — |
|  |  | Nervonic acid | — | — | — | — | — | — | — | — |
|  |  | Elaidic acid | — | — | — | — | — | — | — | — |
|  |  | 10-Undecylenic acid | — | — | — | — | — | — | — | — |
|  |  | Stearic acid | — | — | — | — | — | — | — | — |
|  |  | Zinc stearate | — | — | — | — | — | — | — | — |
|  |  | Ratio of carboxyl group and carboxylate group ((d + e)/(b)) | 0.11 | 0.11 | 0.11 | 0.11 | 0.11 | 0.11 | 0.11 | 0.11 |
|  |  | Neutralization degree (mole %) | 100 | 110 | 120 | 140 | 150 | 160 | 180 | 200 |
| Spherical core | Compression deformation amount (mm) |  | 3.8 | 3.8 | 3.8 | 3.8 | 3.8 | 3.8 | 3.8 | 3.8 |
|  | Coefficient of restitution |  | 0.006 | 0.007 | 0.008 | 0.007 | 0.004 | 0.002 | −0.003 | −0.007 |
| Cover | Slab hardness (Shore D) |  | 65 | 65 | 65 | 65 | 65 | 65 | 65 | 65 |
|  | Thickness (mm) |  | 1.5 | 1.5 | 1.5 | 1.5 | 1.5 | 1.5 | 1.5 | 1.5 |
| Golf ball | Compression deformation amount (mm) |  | 3.3 | 3.3 | 3.3 | 3.3 | 3.3 | 3.3 | 3.3 | 3.3 |
|  | Coefficient of restitution |  | 0.006 | 0.007 | 0.008 | 0.007 | 0.004 | 0.002 | −0.003 | −0.007 |
|  | Flight distance on driver shots (yd) |  | 1.0 | 1.2 | 1.3 | 1.2 | 0.7 | 0.3 | −0.7 | −1.2 |
|  | Durability |  | G | G | G | G | G | G | G | G |

TABLE 7

|  |  |  | Golf ball No. | | | | | | | |
|---|---|---|---|---|---|---|---|---|---|---|
|  |  |  | 46 | 47 | 48 | 49 | 50 | 51 | 52 |
| Rubber composition | Amount (parts by mass) | BR730 | 100 | 100 | 100 | 100 | 100 | 100 | 100 |
|  |  | ZN-DA90S | 28 | 28 | 31 | 28 | 28 | 28 | 28 |
|  |  | Dicumyl peroxide | 0.8 | 0.8 | 0.8 | 0.8 | 0.8 | 0.8 | 0.8 |
|  |  | Zinc oxide | 3.2 | 3.3 | 3.8 | 4.0 | 4.9 | 3.3 | 3.5 |
|  |  | PBDS | 0.63 | 0.63 | 0.63 | 0.63 | 0.63 | 0.63 | 0.63 |
|  |  | Barium sulfate | Appropriate amount | Appropriate amount | Appropriate amount | Appropriate amount | Appropriate amount | Appropriate amount | Appropriate amount |
|  |  | Oleic acid | — | — | — | — | — | — | — |
|  |  | Zinc oleate | 3 | 5 | 10 | — | — | — | — |
|  |  | Myristoleic acid | — | — | — | — | — | — | — |

TABLE 7-continued

|  |  |  | Golf ball No. | | | | | | |
|---|---|---|---|---|---|---|---|---|---|
|  |  |  | 46 | 47 | 48 | 49 | 50 | 51 | 52 |
|  |  | Palmitoleic acid | — | — | — | — | — | — | — |
|  |  | Eicosenoic acid | — | — | — | — | — | — | — |
|  |  | Erucic acid | — | — | — | — | — | — | — |
|  |  | Nervonic acid | — | — | — | — | — | — | — |
|  |  | Elaidic acid | — | — | — | — | — | — | — |
|  |  | 10-Undecylenic acid | — | — | — | — | — | — | — |
|  |  | Stearic acid | — | — | — | 5 | 10 | — | — |
|  |  | Zinc stearate | — | — | — | — | — | 5 | 10 |
|  |  | Ratio of carboxyl group and carboxylate group ((d + e)/(b)) | 0.08 | 0.10 | 0.15 | 0.11 | 0.18 | 0.10 | 0.17 |
|  |  | Neutralization degree (mole %) | 130 | 130 | 130 | 130 | 130 | 130 | 130 |
| Spherical core |  | Compression deformation amount (mm) | 3.8 | 3.8 | 3.8 | 3.8 | 3.8 | 3.8 | 3.8 |
|  |  | Coefficient of restitution | 0.007 | 0.010 | 0.005 | 0.000 | 0.000 | 0.000 | 0.000 |
| Cover |  | Slab hardness (Shore D) | 65 | 65 | 65 | 65 | 65 | 65 | 65 |
|  |  | Thickness (mm) | 1.5 | 1.5 | 1.5 | 1.5 | 1.5 | 1.5 | 1.5 |
| Golf ball |  | Compression deformation amount (mm) | 3.3 | 3.3 | 3.3 | 3.3 | 3.3 | 3.3 | 3.3 |
|  |  | Coefficient of restitution | 0.007 | 0.010 | 0.005 | 0.000 | 0.000 | 0.000 | 0.000 |
|  |  | Flight distance on driver shots (yd) | 1.2 | 1.7 | 1.0 | 0.0 | 0.0 | 0.0 | 0.0 |
|  |  | Durability | G | G | G | G | G | G | G |

TABLE 8

|  |  |  | Golf ball No. | | | | | |
|---|---|---|---|---|---|---|---|---|
|  |  |  | 53 | 54 | 55 | 56 | 57 | 58 |
| Rubber composition | Amount (parts by mass) | BR730 | 100 | 100 | 100 | 100 | 100 | 100 |
|  |  | ZN-DA90S | 28 | 28 | 28 | 28 | 28 | 28 |
|  |  | Dicumyl peroxide | 0.8 | 0.8 | 0.8 | 0.8 | 0.8 | 0.8 |
|  |  | Zinc oxide | 3.6 | 4.0 | 5.0 | 3.6 | 4.0 | 5.0 |
|  |  | PBDS | 0.63 | 0.63 | 0.63 | 0.63 | 0.63 | 0.63 |
|  |  | Barium sulfate | Appropriate amount | Appropriate amount | Appropriate amount | Appropriate amount | Appropriate amount | Appropriate amount |
|  |  | Oleic acid | — | — | — | — | — | — |
|  |  | Zinc oleate | — | — | — | — | — | — |
|  |  | Myristoleic acid | 3 | 5 | 10 | — | — | — |
|  |  | Palmitoleic acid | — | — | — | 3 | 5 | 10 |
|  |  | Eicosenoic acid | — | — | — | — | — | — |
|  |  | Erucic acid | — | — | — | — | — | — |
|  |  | Nervonic acid | — | — | — | — | — | — |
|  |  | Elaidic acid | — | — | — | — | — | — |
|  |  | 10-Undecylenic acid | — | — | — | — | — | — |
|  |  | Stearic acid | — | — | — | — | — | — |
|  |  | Zinc stearate | — | — | — | — | — | — |
|  |  | Amount of carbon-carbon double bond in component (d) (mmol/g) | 4.42 | 4.42 | 4.42 | 3.93 | 3.93 | 3.93 |
|  |  | Ratio of a total of carbon-carbon double bonds ((d)/(b)) | 0.05 | 0.09 | 0.18 | 0.05 | 0.08 | 0.16 |
|  |  | Ratio of carboxyl group and carboxylate group ((d + e)/(b)) | 0.09 | 0.13 | 0.22 | 0.09 | 0.12 | 0.20 |
|  |  | Neutralization degree (mole %) | 130 | 130 | 130 | 130 | 130 | 130 |
| Spherical core |  | Compression deformation amount (mm) | 3.8 | 3.8 | 3.8 | 3.8 | 3.8 | 3.8 |
|  |  | Coefficient of restitution | 0.003 | 0.005 | 0.002 | 0.004 | 0.006 | 0.003 |
| Cover |  | Slab hardness (Shore D) | 65 | 65 | 65 | 65 | 65 | 65 |
|  |  | Thickness (mm) | 1.5 | 1.5 | 1.5 | 1.5 | 1.5 | 1.5 |
| Golf ball |  | Compression deformation amount (mm) | 3.3 | 3.3 | 3.3 | 3.3 | 3.3 | 3.3 |
|  |  | Coefficient of restitution | 0.003 | 0.005 | 0.002 | 0.004 | 0.006 | 0.003 |
|  |  | Flight distance on driver shots (yd) | 0.5 | 0.9 | 0.3 | 0.7 | 1.0 | 0.5 |
|  |  | Durability | G | G | G | G | G | G |

TABLE 9

| | | | Golf ball No. | | | | | |
|---|---|---|---|---|---|---|---|---|
| | | | 59 | 60 | 61 | 62 | 63 | 64 |
| Rubber composition | Amount (parts by mass) | BR730 | 100 | 100 | 100 | 100 | 100 | 100 |
| | | ZN-DA90S | 28 | 28 | 28 | 28 | 28 | 28 |
| | | Dicumyl peroxide | 0.8 | 0.8 | 0.8 | 0.8 | 0.8 | 0.8 |
| | | Zinc oxide | 3.6 | 4.0 | 5.0 | 3.6 | 4.0 | 5.0 |
| | | PBDS | 0.63 | 0.63 | 0.63 | 0.63 | 0.63 | 0.63 |
| | | Barium sulfate | Appropriate amount | Appropriate amount | Appropriate amount | Appropriate amount | Appropriate amount | Appropriate amount |
| | | Oleic acid | — | — | — | — | — | — |
| | | Zinc oleate | — | — | — | — | — | — |
| | | Myristoleic acid | — | — | — | — | — | — |
| | | Palmitoleic acid | — | — | — | — | — | — |
| | | Eicosenoic acid | 3 | 5 | 10 | — | — | — |
| | | Erucic acid | — | — | — | 3 | 5 | 10 |
| | | Nervonic acid | — | — | — | — | — | — |
| | | Elaidic acid | — | — | — | — | — | — |
| | | 10-Undecylenic acid | — | — | — | — | — | — |
| | | Stearic acid | — | — | — | — | — | — |
| | | Zinc stearate | — | — | — | — | — | — |
| | Amount of carbon-carbon double bond in component (d) (mmol/g) | | 3.22 | 3.22 | 3.22 | 2.95 | 2.95 | 2.95 |
| | Ratio of a total of carbon-carbon double bonds ((d)/(b)) | | 0.04 | 0.07 | 0.13 | 0.04 | 0.06 | 0.12 |
| | Ratio of carboxyl group and carboxylate group ((d + e)/(b)) | | 0.08 | 0.10 | 0.17 | 0.07 | 0.10 | 0.16 |
| | Neutralization degree (mole %) | | 130 | 130 | 130 | 130 | 130 | 130 |
| Spherical core | Compression deformation amount (mm) | | 3.8 | 3.8 | 3.8 | 3.8 | 3.8 | 3.8 |
| | Coefficient of restitution | | 0.008 | 0.011 | 0.006 | 0.010 | 0.013 | 0.008 |
| Cover | Slab hardness (Shore D) | | 65 | 65 | 65 | 65 | 65 | 65 |
| | Thickness (mm) | | 1.5 | 1.5 | 1.5 | 1.5 | 1.5 | 1.5 |
| Golf ball | Compression deformation amount (mm) | | 3.3 | 3.3 | 3.3 | 3.3 | 3.3 | 3.3 |
| | Coefficient of restitution | | 0.008 | 0.011 | 0.006 | 0.010 | 0.013 | 0.008 |
| | Flight distance on driver shots (yd) | | 1.4 | 1.9 | 1.0 | 1.7 | 2.2 | 1.4 |
| | Durability | | G | G | G | G | G | G |

TABLE 10

| | | | Golf ball No. | | | | | | | |
|---|---|---|---|---|---|---|---|---|---|---|
| | | | 65 | 66 | 67 | 68 | 69 | 70 | 71 | 72 |
| Rubber composition | Amount (parts by mass) | BR730 | 100 | 100 | 100 | 100 | 100 | 100 | 100 | 100 |
| | | ZN-DA90S | 28 | 28 | 28 | 28 | 28 | 28 | 28 | 28 |
| | | Dicumyl peroxide | 0.8 | 0.8 | 0.8 | 0.8 | 0.8 | 0.8 | 0.8 | 0.8 |
| | | Zinc oxide | 3.6 | 4.0 | 5.0 | 4.0 | 5.0 | 4.4 | 5.9 | 5.0 |
| | | PBDS | 0.63 | 0.63 | 0.63 | 0.63 | 0.63 | 0.63 | 0.63 | 0.63 |
| | | Barium sulfate | Appropriate amount | Appropriate amount | Appropriate amount | Appropriate amount | Appropriate amount | Appropriate amount | Appropriate amount | Appropriate amount |
| | | Oleic acid | — | — | — | — | — | — | — | — |
| | | Zinc oleate | — | — | — | — | — | — | — | — |
| | | Myristoleic acid | — | — | — | — | — | — | — | — |
| | | Palmitoleic acid | — | — | — | — | — | — | — | — |
| | | Eicosenoic acid | — | — | — | — | — | — | — | — |
| | | Erucic acid | — | — | — | — | — | — | — | — |
| | | Nervonic acid | 3 | 5 | 10 | — | — | — | — | — |
| | | Elaidic acid | — | — | — | 5 | 10 | — | — | — |
| | | 10-Undecylenic acid | — | — | — | — | — | 5 | 10 | — |
| | | Stearic acid | — | — | — | — | — | — | — | — |
| | | Zinc stearate | — | — | — | — | — | — | — | — |
| | Amount of carbon-carbon double bond in component (d) (mmol/g) | | 2.73 | 2.73 | 2.73 | 3.54 | 3.54 | 5.43 | 5.43 | — |
| | Ratio of a total of carbon-carbon double bonds ((d)/(b)) | | 0.03 | 0.06 | 0.11 | 0.07 | 0.15 | 0.11 | 0.22 | — |
| | Ratio of carboxyl group and carboxylate group ((d + e)/(b)) | | 0.07 | 0.09 | 0.15 | 0.11 | 0.18 | 0.15 | 0.26 | 0.04 |
| | Neutralization degree (mole %) | | 130 | 130 | 130 | 130 | 130 | 130 | 130 | 150 |

TABLE 10-continued

| | | Golf ball No. | | | | | | | |
|---|---|---|---|---|---|---|---|---|---|
| | | 65 | 66 | 67 | 68 | 69 | 70 | 71 | 72 |
| Spherical | Compression deformation amount (mm) | 3.8 | 3.8 | 3.8 | 3.8 | 3.8 | 3.8 | 3.8 | 3.8 |
| core | Coefficient of restitution | 0.012 | 0.015 | 0.010 | 0.000 | 0.000 | 0.003 | 0.002 | Standard |
| Cover | Slab hardness (Shore D) | 65 | 65 | 65 | 65 | 65 | 65 | 65 | 65 |
| | Thickness (mm) | 1.5 | 1.5 | 1.5 | 1.5 | 1.5 | 1.5 | 1.5 | 1.5 |
| Golf ball | Compression deformation amount (mm) | 3.3 | 3.3 | 3.3 | 3.3 | 3.3 | 3.3 | 3.3 | 3.3 |
| | Coefficient of restitution | 0.012 | 0.015 | 0.010 | 0.000 | 0.000 | 0.003 | 0.002 | Standard |
| | Flight distance on driver shots (yd) | 2.1 | 2.6 | 1.7 | 0.0 | 0.0 | 0.5 | 0.3 | Standard |
| | Durability | G | G | G | G | G | G | G | G |

The materials used in Tables 1 to 10 are shown below.

BR730: high-cis polybutadiene rubber (amount of cis-1,4 bond=96 mass %, amount of 1,2-vinyl bond=1.3 mass %, Moony viscosity ($ML_{1+4}$ (100° C.)=55, molecular weight distribution (Mw/Mn)=3) available from JSR Corporation ZN-DA90S: zinc acrylate (containing zinc stearate in an amount of 10 mass %) available from Nisshoku Techno Fine Chemical Co., Ltd.

Dicumyl peroxide: available from Tokyo Chemical Industry Co., Ltd.

Zinc oxide: "Ginrei R" available from Toho Zinc Co., Ltd.

PBDS: bis(pentabromophenyl)disulfide available from Kawaguchi Chemical Industry Co., Ltd.

Barium sulfate: "Barium sulfate BD" available from Sakai Chemical Industry Co., Ltd.

Oleic acid: unsaturated fatty acid (C18, (9); in the chemical formula (2), $R^{11}$ has a carbon number of 8, $R^{12}$ has a carbon number of 7, carbon atom number of $R^{11}$/carbon atom number of $R^{12}$=1.1) available from Tokyo Chemical Industry Co., Ltd.

Zinc oleate: metal salt of unsaturated fatty acid (C18, (9); in the chemical formula (2), $R^{11}$ has a carbon number of 8, $R^{12}$ has a carbon number of 7, carbon atom number of $R^{11}$/carbon atom number of $R^{12}$=1.1) available from Mitsuwa Chemicals Co., Ltd.

Stearic acid: saturated fatty acid available from Tokyo Chemical Industry Co., Ltd.

Zinc stearate: metal salt of saturated fatty acid available from Nihon Joryu Kogyo Co., Ltd.

Linoleic acid: available from Tokyo Chemical Industry Co., Ltd.

Linolenic acid: available from Tokyo Chemical Industry Co., Ltd.

Stearidonic acid: available from Wako Pure Chemical Industries, Ltd.

Myristoleic acid: unsaturated fatty acid (C14, (9); in the chemical formula (2), $R^{11}$ has a carbon atom number of 4, $R^{12}$ has a carbon atom number of 7, carbon atom number of $R^{11}$/carbon atom number of $R^{12}$=0.6) available from Tokyo Chemical Industry Co., Ltd.

Palmitoleic acid: unsaturated fatty acid (C16, (9); in the chemical formula (2), $R^{11}$ has a carbon atom number of 6, $R^{12}$ has a carbon atom number of 7, carbon atom number of $R^{11}$/carbon atom number of $R^{12}$=0.9) available from Tokyo Chemical Industry Co., Ltd.

Eicosenoic acid: unsaturated fatty acid (C20, (11); in the chemical formula (2), $R^{11}$ has a carbon atom number of 8, $R^{12}$ has a carbon atom number of 9, carbon atom number of $R^{11}$/carbon atom number of $R^{12}$=0.9) available from Tokyo Chemical Industry Co., Ltd.

Erucic acid: unsaturated fatty acid (C22, (13); in the chemical formula (2), $R^{11}$ has a carbon atom number of 8, $R^{12}$ has a carbon atom number of 11, carbon atom number of $R^{11}$/carbon atom number of $R^{12}$=0.7) available from Tokyo Chemical Industry Co., Ltd.

Nervonic acid: unsaturated fatty acid (C24, (15); in the chemical formula (2), $R^{11}$ has a carbon atom number of 8, $R^{12}$ has a carbon atom number of 13, carbon atom number of $R^{11}$/carbon atom number of $R^{12}$=0.6) available from Tokyo Chemical Industry Co., Ltd.

Elaidic acid: unsaturated fatty acid (C18, (9); in the chemical formula (2), $R^{11}$ has a carbon atom number of 8, $R^{12}$ has a carbon atom number of 7, carbon atom number of $R^{11}$/carbon atom number of $R^{12}$=1.1) available from Tokyo Chemical Industry Co., Ltd.

10-Undecylenic acid: unsaturated fatty acid (C11, (10); in the chemical formula (2), $R^{11}$ has a carbon atom number of 0, $R^{12}$ has a carbon atom number of 8) available from Nitto Chemical Co. Ltd.

(2) Production of Cover and Production of Golf Ball

Cover materials having the formulation shown in Table 11 were extruded with a twin-screw kneading extruder to prepare a cover composition in a pellet form. The extruding conditions of the cover composition were a screw diameter of 45 mm, a screw rotational speed of 200 rpm, and screw L/D=35, and the mixture was heated to 160 to 230° C. at the die position of the extruder. The obtained cover composition was injection molded onto the spherical core obtained above to produce a golf ball comprising a spherical core and a cover covering the spherical core.

TABLE 11

| Cover composition | Parts by mass |
|---|---|
| Himilan 1605 | 50 |
| Himilan 1706 | 50 |
| Titanium oxide | 4 |

The materials used in Table 11 are shown below.

Himilan 1605: sodium ion neutralized ethylene-methacrylic acid copolymer ionomer resin available from Du Pont-Mitsui Polychemicals Co., Ltd.

Himilan 1706: zinc ion neutralized ethylene-methacrylic acid copolymer ionomer resin available from Du Pont-Mitsui Polychemicals Co., Ltd.

Titanium oxide: A220 available from Ishihara Sangyo Kaisha, Ltd.

As shown in Tables 1 to 4, the golf balls No. 1 to 5, 8 to 13, 16 to 18, 23, and 24 are the cases where the spherical cores thereof are formed from a rubber composition containing (a) a base rubber, (b) a co-crosslinking agent, (c) a crosslinking initiator, (d) an unsaturated fatty acid having a carbon-carbon double bond in an amount per unit mass ranging from 1.00 mmol/g to 10.00 mmol/g and/or a metal salt thereof, and (f) a metal compound. The spherical cores of these golf balls have a high resilience, and these golf balls show an excellent flight performance. On the other hand, the golf balls No. 19 to 22, and 30 are the cases where the spherical cores thereof do not contain (d) an unsaturated fatty acid and/or a metal salt thereof, thus the spherical cores have a low resilience and these golf balls have a poor flight performance. Further, the golf balls No. 26 to 29 are the cases where the unsaturated fatty acid and/or the metal salt thereof contained in the spherical cores thereof has a carbon-carbon double bond in an amount per unit mass falling outside the range from 1.00 mmol/g to 10.00 mmol/g, thus the spherical cores have a low resilience and these golf balls have a poor flight performance.

As shown in Tables 5 to 10, the golf balls No. 31 to 35, 38 to 43, 46 to 48, 53 to 67, 70, and 71 are the cases where the spherical cores thereof are formed from a rubber composition containing (a) a base rubber, (b) a co-crosslinking agent, (c) a crosslinking initiator, (d) an unsaturated fatty acid having 5 or more carbon atoms and having the first carbon-carbon double bond at the fourth or later carbon counted from the carboxyl group side and/or a metal salt thereof, and (f) a metal compound. The spherical cores of these golf balls have a high resilience, and these golf balls show an excellent flight performance.

The golf ball of the present invention has an excellent flight performance.

This application is based on Japanese patent applications No. 2015-178224 and No. 2015-178225, both filed on Sep. 10, 2015, the contents of which are hereby incorporated by reference.

The invention claimed is:

1. A golf ball comprising a spherical core and at least one cover covering the spherical core,
wherein the spherical core is formed from a rubber composition containing:
(a) a base rubber,
(b) an α,β-unsaturated carboxylic acid having 3 to 8 carbon atoms and/or a metal salt thereof as a co-crosslinking agent,
(c) a crosslinking initiator,
(d) an unsaturated fatty acid excluding an α,β-unsaturated carboxylic acid having 3 to 8 carbon atoms, and
(g) an organic sulfur compound, and
provided that the rubber composition further contains (f) a metal compound if only an α,β-unsaturated carboxylic acid having 3 to 8 carbon atoms is present as (b) the co-crosslinking agent;
wherein (a) the base rubber contains a polybutadiene rubber and a polyisoprene rubber, and a mass ratio (polybutadiene rubber/polyisoprene rubber) of the polybutadiene rubber to the polyisoprene rubber in (a) the base rubber is 1 or more, and 20 or less,
wherein (d) the unsaturated fatty acid has a carbon-carbon double bond in an amount per unit mass ranging from 1.00 mmol/g to 10.00 mmol/g,
wherein the rubber composition contains a single kind of (c) the crosslinking initiator,
wherein the rubber composition contains (c) the crosslinking initiator in an amount ranging from 0.2 part by mass to 0.9 part by mass with respect to 100 parts by mass of (a) the base rubber, and
wherein the rubber composition contains (g) the organic sulfur compound in an amount ranging from 0.05 part by mass to 2.0 parts by mass with respect to 100 parts by mass of (a) the base rubber.

2. The golf ball according to claim 1, wherein the rubber composition contains (d) the unsaturated fatty acid in an amount ranging from 1 part by mass to 35 parts by mass with respect to 100 parts by mass of (a) the base rubber.

3. The golf ball according to claim 1, wherein (d) the unsaturated fatty acid is an unsaturated fatty acid having 4 to 33 carbon atoms.

4. The golf ball according to claim 3, wherein (d) the unsaturated fatty acid is an unsaturated fatty acid having one or two carbon-carbon double bonds.

5. The golf ball according to claim 1, wherein (d) the unsaturated fatty acid is an unsaturated fatty acid having 5 or more carbon atoms and having a first carbon-carbon double bond at a fourth or later carbon counted from a carboxyl group side thereof.

6. The golf ball according to claim 5, wherein (d) the unsaturated fatty acid is an unsaturated fatty acid represented by a chemical formula (1),

[Chemical formula 1]

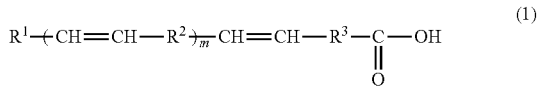

in the chemical formula (1), $R^1$ represents a hydrogen atom or an alkyl group having 1 to 25 carbon atoms, $R^2$ represents an alkylene group having 1 to 25 carbon atoms, $R^3$ represents an alkylene group having 2 to 25 carbon atoms, m represents a natural number ranging from 0 to 5, and when m ranges from 2 to 5, multiple $R^2$ may be identical to or different from each other.

7. The golf ball according to claim 6, wherein (d) the unsaturated fatty acid is a linear unsaturated fatty acid.

8. The golf ball according to claim 6, wherein (d) the unsaturated fatty acid is an unsaturated fatty acid having a carbon-carbon double bond at a terminal of the hydrocarbon chain, and/or an unsaturated fatty acid having at least one cis-isomerized carbon-carbon double bond.

9. The golf ball according to claim 1, wherein the rubber composition contains (b) the metal salt of the α,β-unsaturated carboxylic acid having 3 to 8 carbon atoms as the co-crosslinking agent.

10. The golf ball according to claim 1, wherein the rubber composition contains (b) the α,β-unsaturated carboxylic acid having 3 to 8 carbon atoms and/or the metal salt thereof in an amount ranging from 15 parts by mass to 50 parts by mass with respect to 100 parts by mass of (a) the base rubber.

11. The golf ball according to claim 1, wherein the rubber composition has a neutralization degree ranging from 100 mole % to 200 mole %.

12. The golf ball according to claim 1, wherein (g) the organic sulfur compound is at least one compound selected from the group consisting of thiophenols, diphenyldisulfides, thionaphthols, thiuramdisulfides, and metal salts thereof.

13. The golf ball according to claim 6, wherein the unsaturated fatty acid represented by the chemical formula (1) is an unsaturated fatty acid represented by the chemical formula (2) or the chemical formula (3),

in the chemical formula (2), $R^{11}$ represents a hydrogen atom or an alkyl group having 1 to 25 carbon atoms, and $R^{12}$ represents an alkylene group having 2 to 25 carbon atoms;

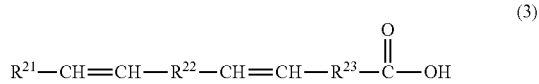

(3)

in the chemical formula (3), $R^{21}$ represents a hydrogen atom or an alkyl group having 1 to 25 carbon atoms, $R^{22}$ represents an alkylene group having 1 to 25 carbon atoms, and $R^{23}$ represents an alkylene group having 2 to 25 carbon atoms.

14. The golf ball according to claim 1, wherein the rubber composition further contains (e) a saturated fatty acid and/or a metal salt thereof.

15. The golf ball according to claim 14, wherein the rubber composition contains (e) the saturated fatty acid and/or the metal salt thereof in an amount ranging from 0.5 part by mass to 5.0 parts by mass with respect to 100 parts by mass of (a) the base rubber.

16. The golf ball according to claim 14, wherein a ratio ((component (d)+component (e))/component (b)) of a total of mole numbers of carboxyl groups (—COOH) and carboxylate groups (—COO⁻) in the component (d) and in the component (e) to a total of mole numbers of carboxyl groups and carboxylate groups in the component (b) ranges from 0.01 to 0.26.

17. The golf ball according to claim 1, wherein the spherical core has a structure represented by the chemical formula (4),

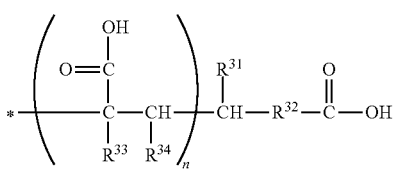

(4)

in the chemical formula (4), $R^{31}$ represents a hydrogen atom or an alkyl group having 1 to 25 carbon atoms, $R^{32}$ represents an alkylene group having 2 to 25 carbon atoms, $R^{33}$ represents a hydrogen atom or an alkyl group having 1 to 5 carbon atoms, $R^{34}$ represents a hydrogen atom, a carboxyl group or an alkyl group having 1 to 5 carbon atoms, * represents a location bonding to a carbon atom in (a) the base rubber, n represents a natural number of 1 or more, and when n is 2 or more, multiple $R^{33}$ and $R^{34}$ may be identical to or different from each other.

18. The golf ball according to claim 1, wherein the rubber composition has a neutralization degree ranging from 100 mole % to 140 mole %.

19. The golf ball according to claim 1, wherein the golf ball is a two-piece golf ball comprising the spherical core, and wherein said cover is a single layered cover disposed around the spherical core.

* * * * *